US008179019B2

(12) United States Patent  (10) Patent No.: US 8,179,019 B2
Volkov                    (45) Date of Patent:     May 15, 2012

(54) POSITIONING APPARATUS AND METHOD

(75) Inventor: Andrii Volkov, Bury (GB)

(73) Assignee: Nanomobile Ltd. (GB)

( * ) Notice: Subject to any disclaimer, the term of this patent is extended or adjusted under 35 U.S.C. 154(b) by 475 days.

(21) Appl. No.: 11/919,291

(22) PCT Filed: Apr. 27, 2006

(86) PCT No.: PCT/GB2006/001564

§ 371 (c)(1),
(2), (4) Date: Jul. 18, 2009

(87) PCT Pub. No.: WO2006/117525

PCT Pub. Date: Nov. 9, 2006

(65) Prior Publication Data

US 2010/0117486 A1   May 13, 2010

(30) Foreign Application Priority Data

Apr. 29, 2005  (GB) .................................. 0508911.5

(51) Int. Cl.
     *H02N 2/12* (2006.01)
(52) U.S. Cl. .............................. 310/323.01; 310/323.03
(58) Field of Classification Search ............ 310/323.01–323.21, 328
     See application file for complete search history.

(56) References Cited

U.S. PATENT DOCUMENTS

| 5,051,646 | A | * | 9/1991 | Elings et al. ................. 310/328 |
| 5,872,418 | A | * | 2/1999 | Wischnewskiy ......... 310/323.06 |
| 6,778,509 | B1 | | 8/2004 | Ravishankar et al. |
| 2004/0224677 | A1 | | 11/2004 | Kuchibhotla et al. |
| 2005/0053035 | A1 | | 3/2005 | Kwak et al. |
| 2006/0145572 | A1 | * | 7/2006 | Vyshnevskyy et al. ....... 310/369 |

FOREIGN PATENT DOCUMENTS

| EP | 0938144 | 8/1999 |
| WO | WO98/07200 | 2/1998 |
| WO | WO2004/036727 | 4/2004 |

OTHER PUBLICATIONS

International Search Report, International Application No. PCT/EP2006/05087, mailed May 15, 2006. (3 pages).

(Continued)

*Primary Examiner* — Derek Rosenau

(74) *Attorney, Agent, or Firm* — Wilmer Cutler Pickering Hale & Dorr LLP.

(57)  ABSTRACT

Positioning apparatus comprises: a first surface; a tubular body and a first end surface at a first end of the tubular body and arranged in contact with the first surface; and surface wave generation means arranged to generate a first travelling surface wave on the first end surface, the first travelling surface wave travelling along a first portion of the first end surface in a first direction, and, while the first travelling surface wave is travelling along the first end surface, to generate a second travelling surface wave on the first end surface, the second travelling surface wave travelling along a second portion of the first end surface in a second direction, the second direction being opposite to the first direction. Interaction between the first surface and the first and second travelling surface waves effects relative movement between the first surface and the tubular body.

25 Claims, 22 Drawing Sheets

OTHER PUBLICATIONS

Universal Mobile Telecommunications System; Medium Access Control protocol Specification (3GPP TS 25.321 version 6.3.0 Release 6) ETSI Standards, European Telecommunications Standards Institute, Sophia-Antipo, FR, vol. 3-R2, No. V630, Dec. 2004, pp. 25-27.

Bansevicius, R, "Piezoelectric multi-degree-of-freedom actuators/sensors", Third International Conference on Motion and Vibration Control, Chiba, Japan, Sep. 1-6, 1996, vol. 3, 1996, pp. K9-K15, XP009070083.

International Search Report, International Application No. PCT/GB2006/001564, mailed Nov. 9, 2006. (3 pages).

International Preliminary Examination Report of Patentability, International Application No. PCT/GB2006/001564, mailed Nov. 8, 2007 (13 pages).

* cited by examiner

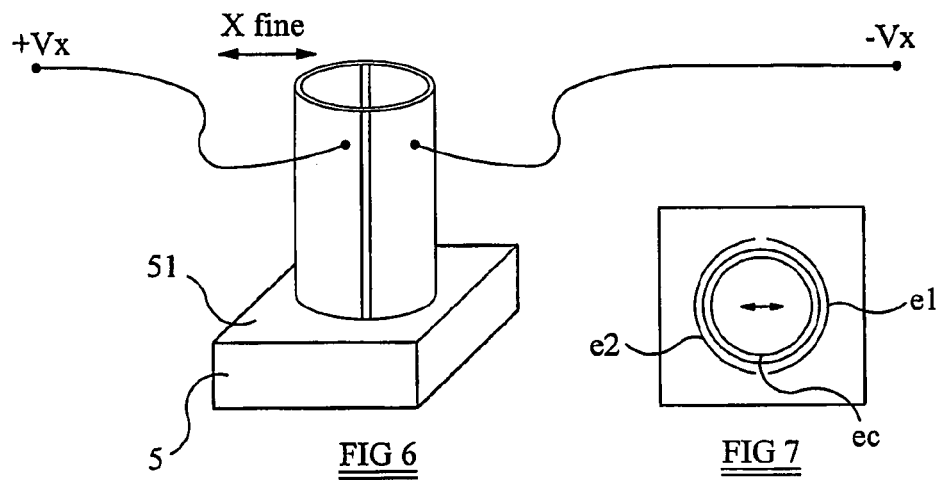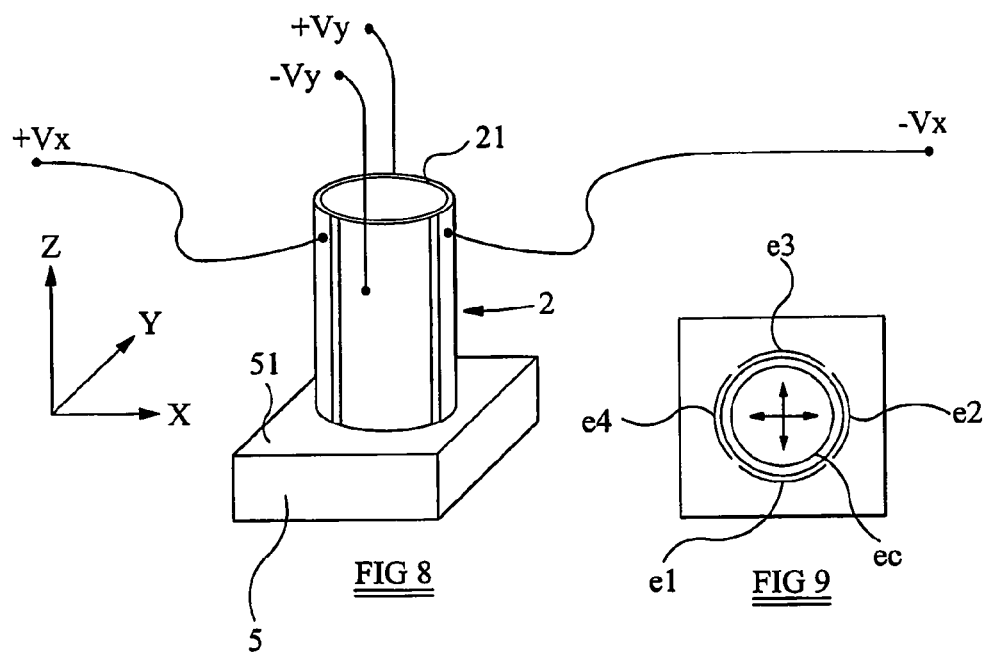

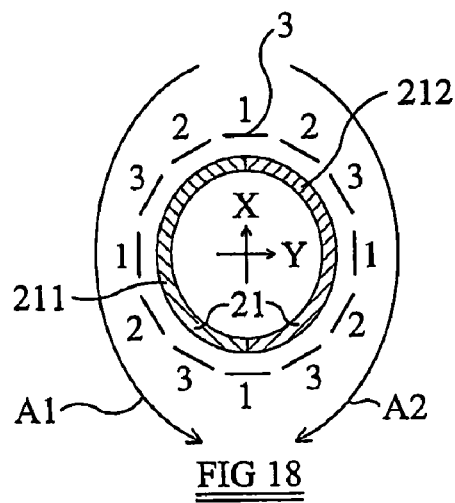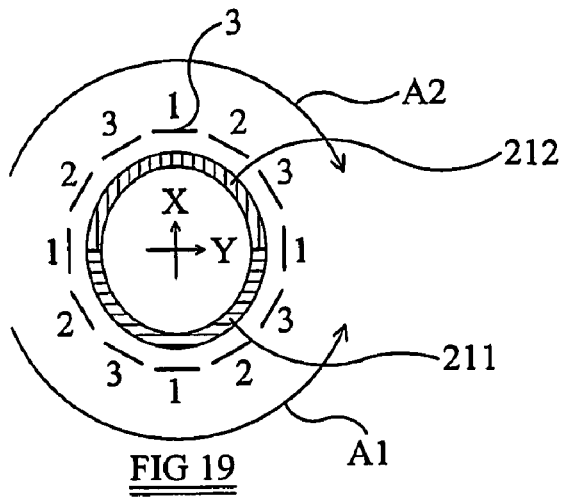
FIG 18    FIG 19
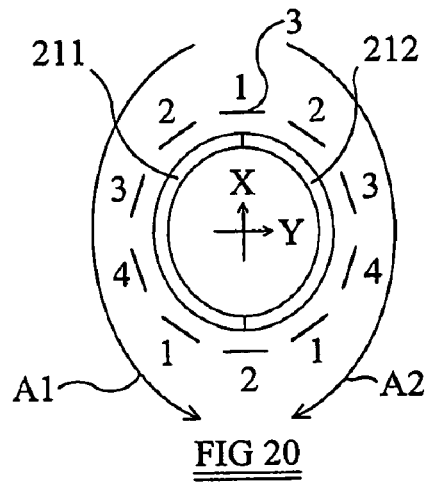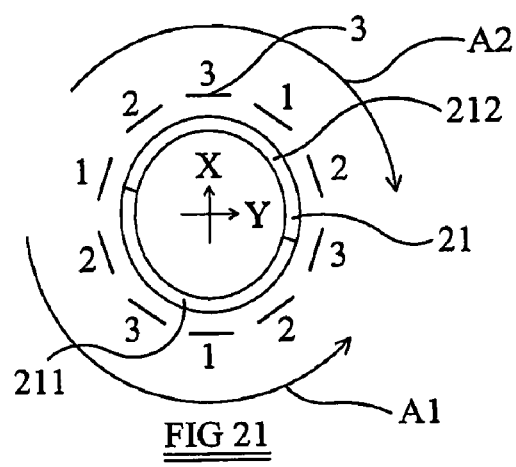
FIG 20    FIG 21
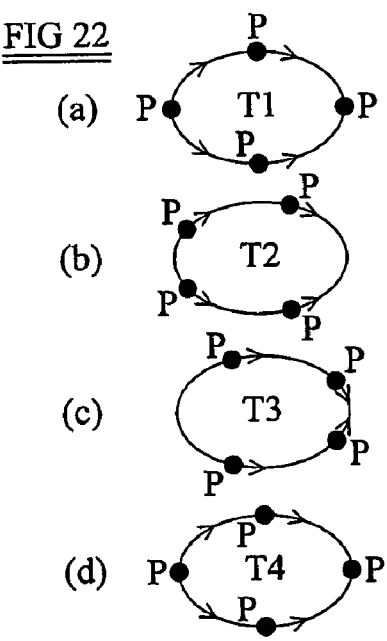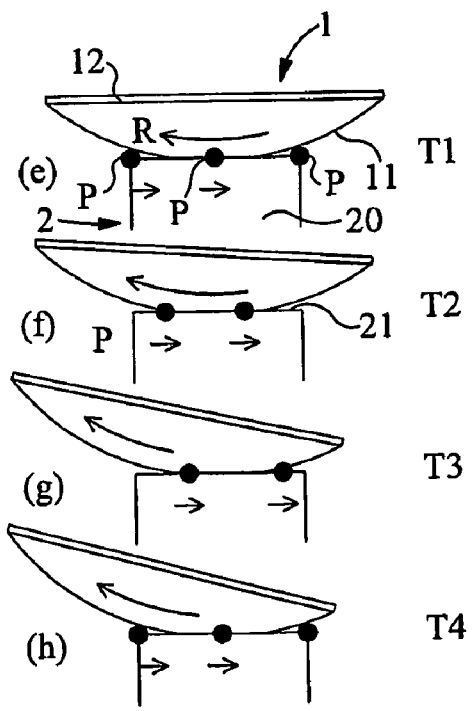
FIG 22

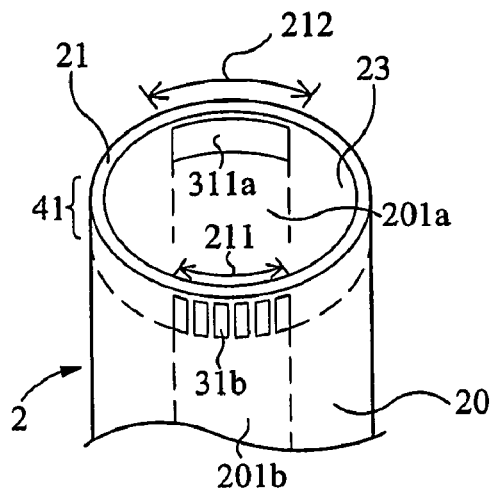
FIG 36
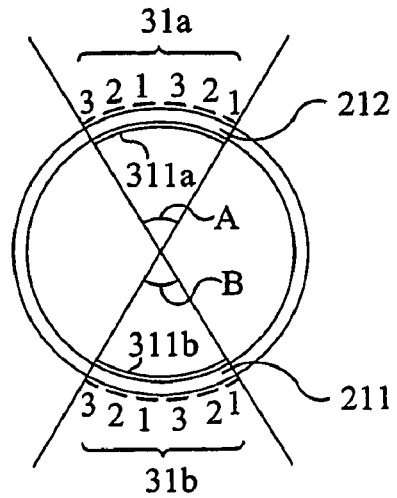
FIG 37
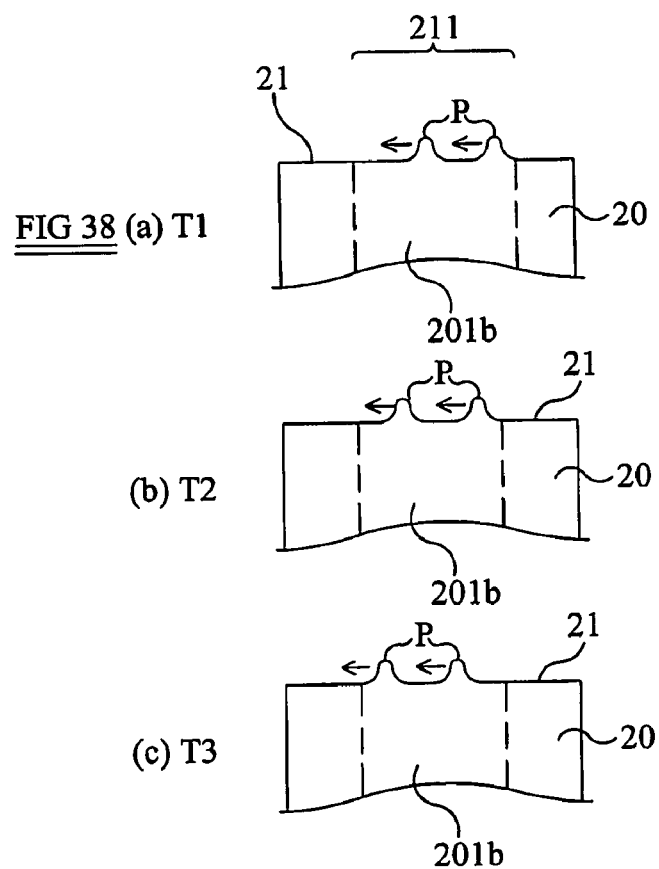
FIG 38 (a) T1
(b) T2
(c) T3

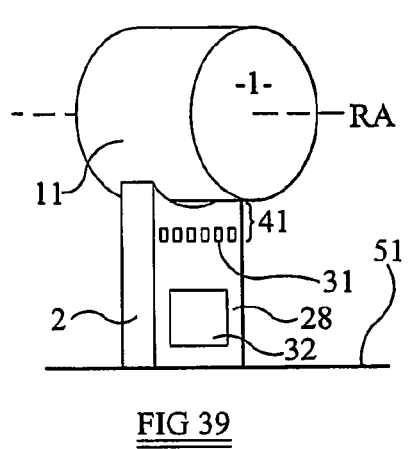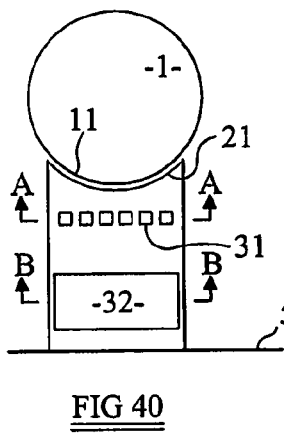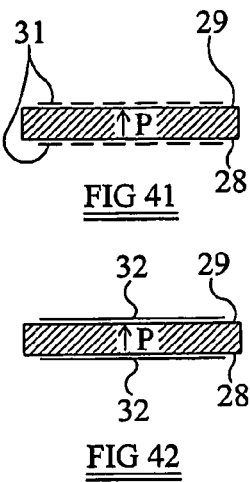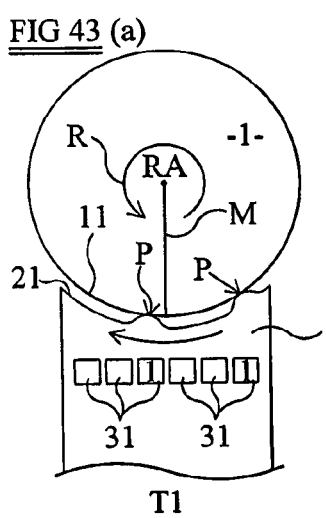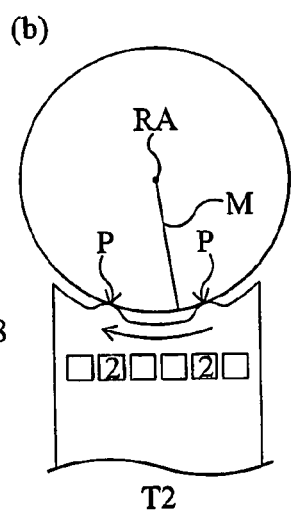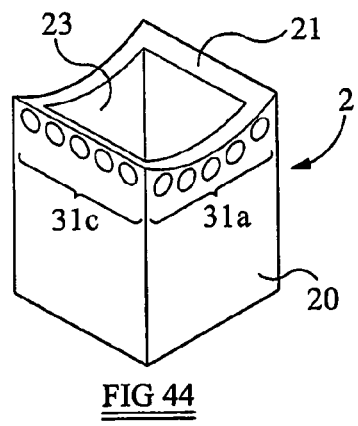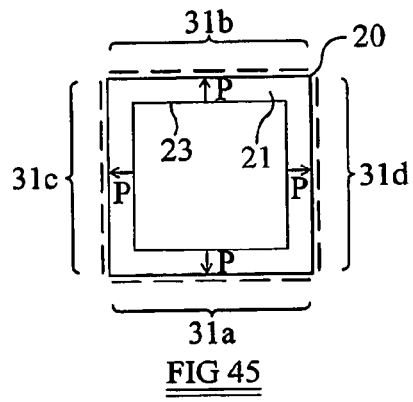

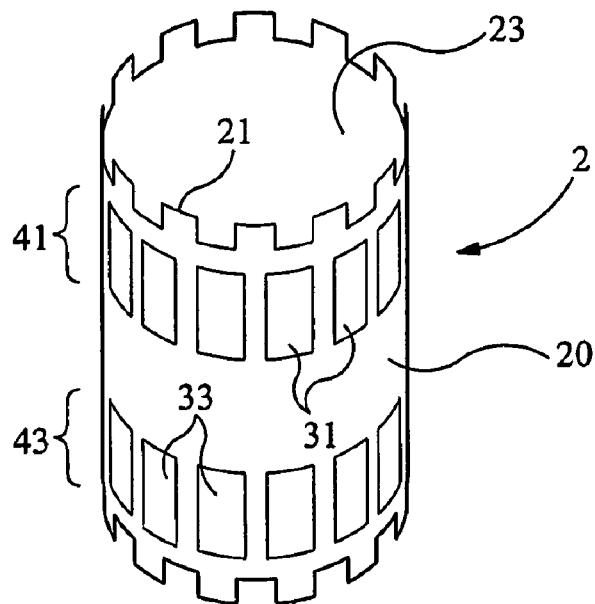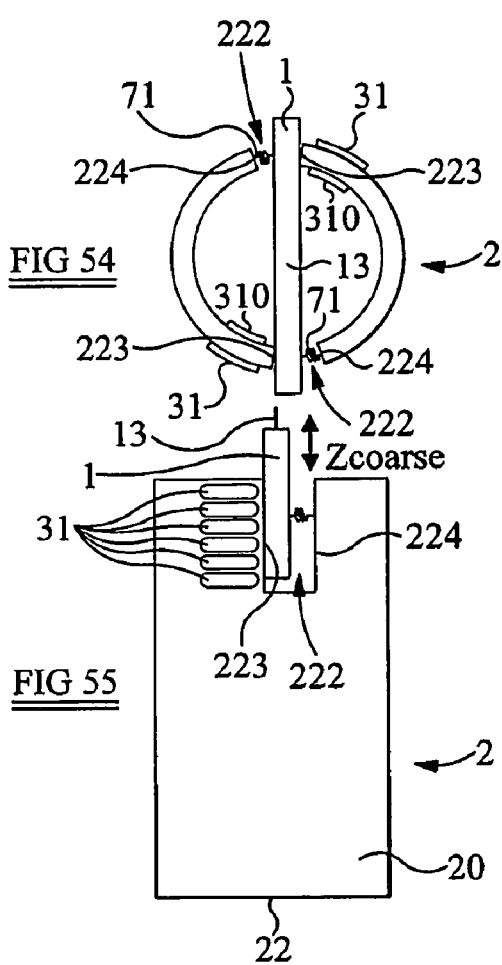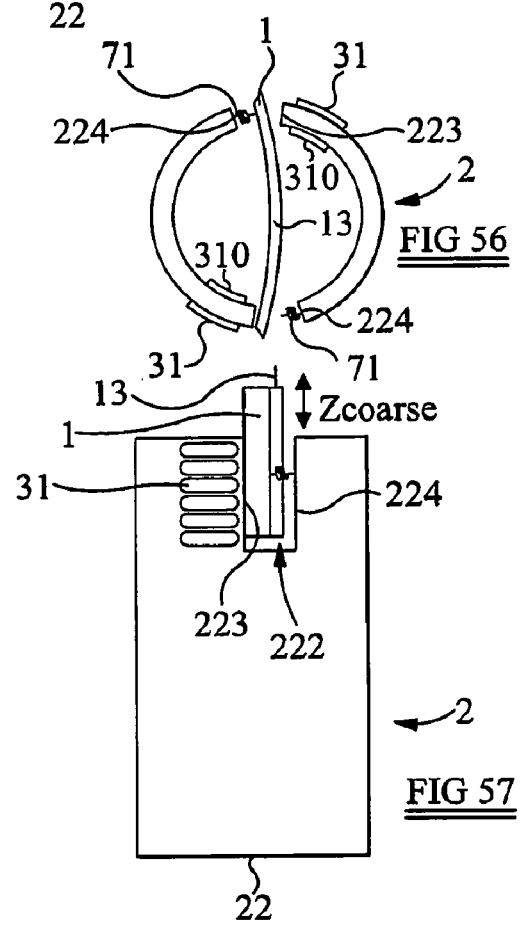

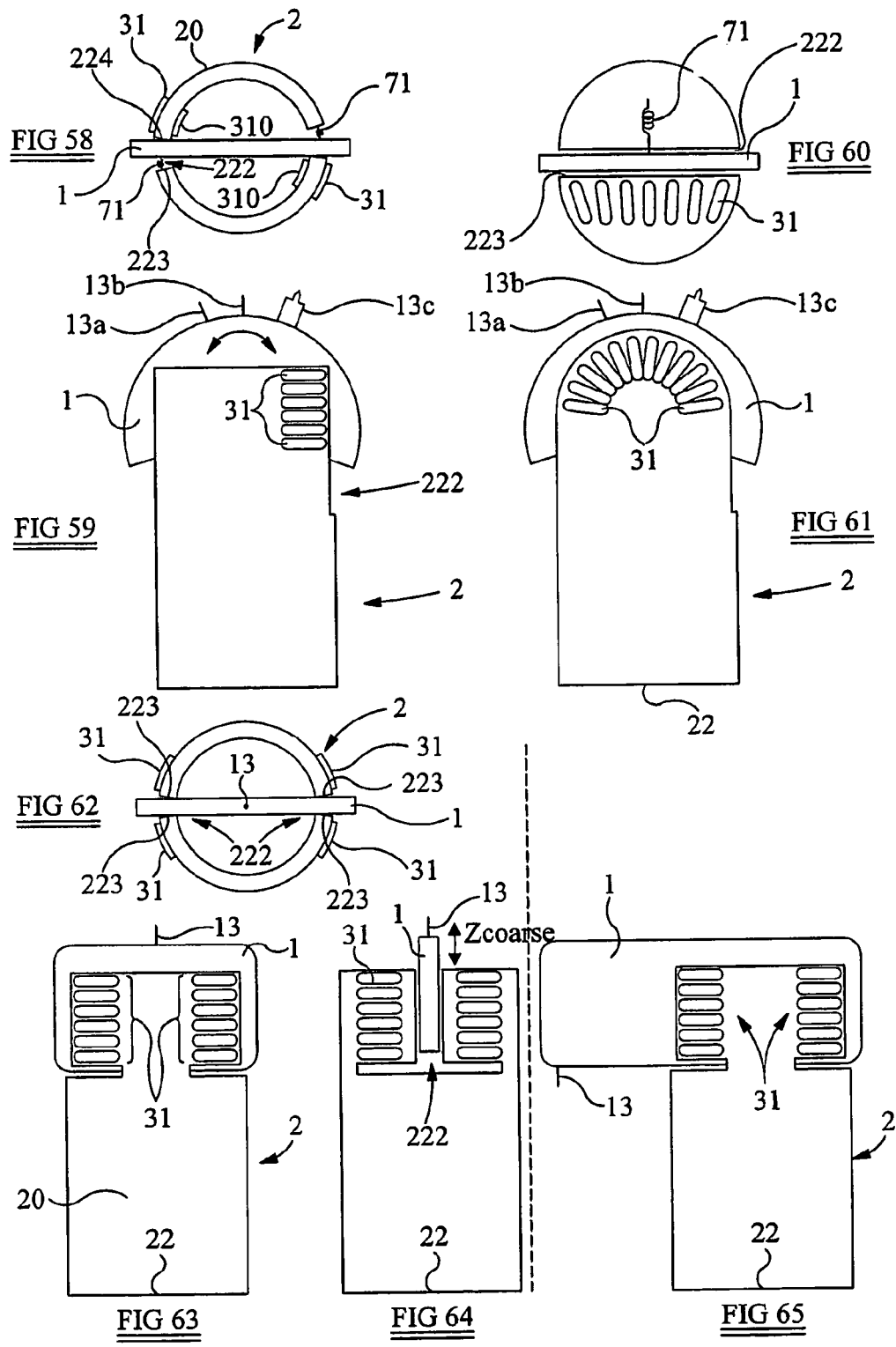

POSITIONING APPARATUS AND METHOD

FIELD OF THE INVENTION

The present invention relates to apparatus and methods for positioning objects, and in particular, although not exclusively, to apparatus and methods for accurate positioning of objects on a nanometer scale or even finer. The positioning apparatus and methods may also be described as manipulation apparatus and methods.

BACKGROUND TO THE INVENTION

The requirement to provide accurate positional control of an object with respect to some other object or reference surface is encountered in a wide variety of applications. These include applications in which it is desirable, or necessary, to achieve accurate positional control on a small scale, such as a nanometer scale or even finer. Examples of applications requiring fine positional control include the positioning of read/write heads with respect to storage media, the positioning of microscope probes or tips with respect to samples and sample surfaces, sample positioning for microscopy or processing, and the manipulation of tools for working on, or handling, single biological cells or small groups of cells. It is known to use piezoelectric materials in positioning and manipulation apparatus, exploiting the small dimensional changes of the materials in response to applied electric fields.

In a number of applications it is desirable to have a positioning system that can provide both a relatively wide range of overall movement (e.g. on the centimeter scale) and yet fine positional control within that range (e.g. a resolution on the micro or nanometer scale, or better). One known type of such a positioning system is illustrated in FIG. 1. This apparatus comprises a stack of three piezoelectric translators, each of which can be regarded as a type of linear motor and has a base member and a movable member having one degree of freedom. Each translator is controllable to provide "coarse" movement (in this example coarse movement is to be considered as movement in the range 1 micron to 1 centimeter) of its movable member in one of the three orthogonal directions (the nominal X, Y and Z directions in the figure). This movement (i.e. translation in one dimension) is achieved using a technique that is known generally as "slip-stick". In the slip-stick technique the base comprises a piezoelectric member and a surface of the movable member is clamped against a surface of the piezoelectric member by suitable clamping means. The clamping means may be adjustable so as to adjust the friction force. The piezoelectric member is then controlled, with a suitable control voltage, such that its surface in contact with the movable member performs sawtooth-like oscillations along the direction of intended translation, i.e. it undergoes a series of slow movements in the direction of intended translation, with rapid movements in the opposite direction in between. If the clamping force is suitably arranged then during the slow movements the two surfaces "stick" and the movable member is moved, but during the fast movements there is slippage and the movable member is not moved. Thus, the asymmetric oscillations, which cause the slipping in one direction and sticking in the opposite direction, result in translation of the movable member. Large translations can thus be built up incrementally from the relatively small translations in each "stick" part of the slip-stick cycle. In FIG. 1 the first translator, or stage, XC provides coarse movement control of its movable member in the X direction. The second translator YC has its base mounted on the first stage's movable member, and provides independent coarse movement control of its own movable member in the Y direction. In the same way, the third stage ZC is mounted on the second stage to provide coarse Z movement control. The interface between the base and movable portions of the third translator is thus vertical, and a disadvantage with the illustrated apparatus is that, as a result of this vertical interface, the weight of any further structure carried by the third stage is limited. To achieve fine positional control, in addition to coarse X, Y and Z control achievable with the three, stacked translators, the last translator ZC carries a device for fine movement on the 1 nanometer—1 micron scale. This fine movement device is a piezoelectric tube capable of 3 degrees of freedom movement (XYZfine). It is known for the tube to be provided with an electrode arrangement such as that shown in FIG. 8 (and which is also suitable for use in embodiments of the invention for the same purpose, i.e. to enable fine positional control in three directions). In such an arrangement the tube has electrodes on an outer and on an inner side, and the outer electrodes are segmented to form four independently drivable sectors on the tube. Fine movement control in the Z direction can be achieved by controlling a voltage applied to the outer electrodes in common, relative to the inner electrode, to produce longitudinal extension or shrinkage of the tube. Fine movement of the tube upper end surface in the X direction can be achieved by applying a potential difference between one opposing pair of outer electrodes (to bend the tube, as the material under one electrode is elongated and that under the opposite electrode shrinks with respect to the longitudinal axis). Similarly, to produce fine displacement control of the end surface in the Y direction, a differential voltage may be applied between the other pair of outer electrodes.

Although the arrangement of FIG. 1, comprising three coarse translators and a piezoelectric tube, does provide both fine and coarse movement control in the X, Y and Z axes, there are a number of disadvantages associated with it. For example, the large number of components leads to the unit being expensive, and increases the probability of some failure occurring. Secondly, the assembly has a relatively large size and mass, which can cause refrigeration problems in certain applications where positioning or manipulation at low temperatures is required; the large size means that a correspondingly large volume must be cooled, and then held at low temperature, the large mass means that a relatively large quantity of heat must be removed to lower the positioning apparatus to the required temperature. The large mass also means that changes from one stable temperature to another desired stable temperature can only be achieved slowly. The arrangement of the tube on a stack of three translators is also highly susceptible to external vibrations. The relatively large size furthermore results in the arrangement exhibiting mechanical (acoustical) noise susceptibility. Thermal drifts are also a problem, as are the limited accessibility of manipulator and the limitations on applications for the manipulator resulting from its relatively large overall size.

It is therefore an object of certain embodiments of the invention to provide positioning apparatus (which term will be understood to include manipulators) that obviates or mitigates at least one of the above-mentioned problems associated with the prior art.

SUMMARY OF THE INVENTION

According to a first aspect of the invention there is provided positioning apparatus comprising:
a first surface;
a tubular body having a longitudinal axis and a first end surface at a first end of the tubular body, the first end surface being arranged in contact with the first surface; and
surface wave generation means arranged to generate a first travelling surface wave on the first end surface, the first travelling surface wave travelling along a first portion of the first end surface in a first direction around the first end surface, and, while the first travelling surface wave is travelling along the first portion of the first end surface, to generate a second travelling surface wave on the first end surface, the second travelling surface wave travelling along a second portion of the first end surface in a second direction around the first end surface, the second direction being opposite to the first direction, such that interaction between the first surface and the first and second travelling surface waves effects relative movement between the first surface and the tubular body.

Depending on the shape of the first surface, the relative movement effected by interaction between the two travelling waves and the first surface may comprise a translation in a direction transverse to the longitudinal axis or a rotation about an axis other than the longitudinal axis (for example rotation about an axis perpendicular to the longitudinal axis). By continuing to generate the oppositely-travelling surface waves, continued translation, or rotation about a transverse axis, can be achieved. Thus, the positioning apparatus provides the advantage that large translational movements, and large rotations about transverse axes, suitable for large-scale (coarse) positioning, can be achieved with a single tubular body, i.e. without having to mount that tubular body on an additional coarse-positioning stage or stages.

In certain preferred embodiments the tubular body is a tube of piezoelectric material, and the surface waves are generated by application of control voltages to appropriately arranged electrodes. These embodiments provide the advantage that the piezoelectric tube is controllable to effect coarse positioning, which can be in addition to the known use of the tube to achieve fine control.

Although piezoelectric tubes may be preferable in certain applications, this first aspect of the invention is not limited to using such materials. For example, in alternative embodiments the tube may comprise magnetostrictive material, in which case the wave generation system will include means for application of suitable magnetic fields. Piezoelectric and magnetostrictive materials are merely examples, however, and in general the tube may have any composition or structure provided that the wave generation system is able to generate the required surface waves.

It will be appreciated that the surface wave generation means may also be described as end surface deformation means, a surface wave generator, or a surface wave generation system. The first and second portions may also be described as first and second segments, and the tubular body may also be referred to as a tubular member. First and second travelling surface waves may also be described as travelling deformation waves.

The deformation of the end surface as the wave travels along comprises at least deformation in direction parallel to the longitudinal axis, i.e. deformation or displacement transverse to the wave propagation direction (which deformation could be used on its own to move an appropriately shaped first surface), but in certain preferred embodiments the deformation additionally comprises longitudinal deformation with respect to propagation direction. By generating travelling surface waves which result in points on the surface following cyclical paths (e.g. elliptical paths), the end surface of the tube is able to provide frictional drive to even a flat first surface.

As the body is tubular, the first end surface is generally annular, and may be planar or be a section of a conical, cylindrical, or spherical surface, for example. Generally, the first end surface faces away from the tubular body, along the longitudinal axis.

In certain preferred embodiments the tubular body is a hollow cylinder having a circular cross section, but tubes having alternative cross-sectional shapes may be used.

Preferably, the tubular body is a solid body, and as mentioned above it may comprise piezoelectric material, which may be polycrystalline. Electric fields may then be applied to the material to effect dimensional changes and generate the first and second travelling surface waves. In certain embodiments, the tube is composed entirely of piezoelectric material, but in alternative embodiments a composite material or a combination of materials may form the tube.

In embodiments employing piezoelectric tubes the surface wave generation means may comprises a plurality of electrodes circumferentially spaced apart around an outer surface and/or an inner surface of the tubular body. Typically, the wave generation means then additionally comprises control means arranged to apply voltages to the spaced-apart electrodes in a predetermined manner (e.g. a predetermined sequence) so as to effect dimensional changes in the piezoelectric material (in other words, to produce strains of the material) and generate the first and second travelling surface waves at the first end surface.

The spaced-apart electrodes may include a first group of electrodes extending around a first section (segment) of the tubular body, the first portion of the first end surface being an end surface of the first section, and a second group of electrodes extending around a second section (segment) of the tubular body, the second portion of the first end surface being an end surface of the second section. Thus, the electrodes for wave generation may be positioned next to the surface portions on which the two waves are generated. These electrodes for wave generation at the first end may be confined to a first end longitudinal segment of the body.

In certain preferred embodiments the spaced-apart electrodes are directly attached to the outer and/or inner surfaces of the tubular body.

The apparatus may further comprise an array of electrodes arranged around a second longitudinal segment of the tubular body, the second longitudinal segment being on the opposite side of the first longitudinal segment to the first end, and displacement control means arranged to apply voltages to the electrodes of the array so as to effect dimensional changes in the piezoelectric material which result in displacement of the first end surface in at least one direction perpendicular to the longitudinal axis.

In other words, the array of electrodes on the second longitudinal segment can be used to produce controlled bending of the tube. The array of electrodes comprises four electrodes in certain preferred embodiments, those four being spaced around the second longitudinal segment and comprising a first diametrically opposed pair and a second diametrically opposed pair. The displacement control means is then arranged to apply voltages to the electrodes of the first pair to effect displacement of the first end surface in a first direction perpendicular to the longitudinal axis and to apply voltages to the electrodes of the second pair to effect displacement of the first end surface in a second direction perpendicular to the longitudinal axis.

In addition, or as an alternative to using the electrodes of the second longitudinal segment to produce bending, voltages applied in unison to all electrodes of the second longitudinal segment may be used to effect displacement (of the end surface) in a direction parallel to the longitudinal axis.

In certain embodiments a separate circular electrode is used to effect displacement in a direction parallel to the longitudinal axis. For example, a pair of circular electrodes may be arranged on inner and outer surfaces respectively of a longitudinal section of the tubular body (as described below, with reference to FIGS. 2, 3 and 51), and a differential voltage applied between these inner and outer electrode "rings" to control elongation/shrinkage along the longitudinal axis.

In certain embodiments, the first surface is flat, and the first and second travelling waves may interact with the first surface to effect relative movement comprising a relative translation between the tubular body and the first surface.

Alternatively, the first surface may be spherical or cylindrical, and the first and second travelling waves may interact with the first surface to effect relative movement comprising a relative rotation between the tubular body and the first surface about an axis perpendicular to the longitudinal axis.

Preferably, the first end surface is shaped so as to correspond to the shape of the portion of the first surface with which it is in contact. In other words, the first end surface is shaped so as to seat against the first surface; the first end surface is shaped so as to conform to the first surface.

In certain embodiments at least one of the surfaces is provided with a surface pattern for entrapping debris and contaminants. In certain embodiments the pattern comprises grooves. The pattern does not affect the performance of the device as long as there is a large enough number of contact points between the surfaces. In certain embodiments the number of grooves in the circumference is a multiple of the number of electrodes around the circumference.

Advantageously, the apparatus may further comprise biasing means arranged to urge the first end surface and the first surface together. Thus, in such arrangements, it may not be necessary to arrange the first surface and tube such that gravity urges them together. By using biasing means, the first surface and tube may be held together in a variety of orientations; as an extreme example, the tube may be suspended from the first surface. The biasing means may take a variety of forms, and may include one or more springs, vacuum suction means, or magnets for example.

In certain preferred embodiments at least one of the first surface and the first end surface comprises wear-resistant material. For example, one or both of the first surface and the first end surface may comprise a coating or layer of wear-resistant material.

Preferably, the first and second travelling surface waves are surface waves in which surface points undergo elliptical motion as the waves pass by, such as Rayleigh or Rayleigh-type surface waves.

In certain embodiments, the first and second portions together comprise the entire first end surface. However, in alternative embodiments the first and second portions together comprise only a portion of the entire first end surface. In such examples, the remainder of the end surface may be uncontrolled, or alternatively the apparatus may be further arranged to generate an additional surface wave or waves on another portion or portions of the end surface. For example, the first and second portions may be diametrically opposed, and the apparatus may include means for generating a further pair of oppositely travelling surface waves on a further pair of diametrically opposed portions of the first end portion. The first and second surface waves may then be used to generate translation in, say, the X direction, and the further waves used to generate translation in the Y direction.

In certain preferred embodiments the first surface is a surface of a body supported by the tube. The apparatus may then further comprise a base supporting the tubular body, the base providing a base surface, and the tubular body having a second end surface at a second end of the tubular body, the second end surface being arranged in contact with the base surface. The surface wave generation means is then further arranged to generate a third travelling surface wave on the second end surface, the third travelling surface wave travelling along a first portion of the second end surface in a first direction around the second end surface, and, while the third travelling surface wave is travelling along the first portion of the second end surface, to generate a fourth travelling surface wave on the second end surface, the fourth travelling surface wave travelling along a second portion of the second end surface in a second direction around the second end surface, such that the third and fourth travelling surface waves interact with the base surface to effect movement of the tubular body relative to the base.

To achieve this, in certain embodiments the tubular body is a tube of piezoelectric material and the surface wave generation means comprises a plurality of electrodes arranged around a third longitudinal segment of the tubular body. The third longitudinal segment is proximate the second end, and control means is arranged to arranged to apply voltages to the third longitudinal segment electrodes in a predetermined sequence so as to effect dimensional changes in the piezoelectric material and generate the third and fourth travelling surface waves.

Thus, means are provided to effect movement at each end of the tube. At one end, surface waves may be generated to translate or rotate a supported body, and at the opposite end, surface waves may be generated to translate the tube over a supporting surface.

Preferably, the positioning further comprises biasing means arranged to urge the second end surface and the base surface together, for example to hold them securely together and/or to permit use of the apparatus in various orientations.

Again, at least one of the second end surface and the base surface preferably comprises wear-resistant material.

In certain embodiments the second end surface and the base surface are flat, and the movement effected between the tubular body and the base comprises translation of the tubular body over the base surface.

According to a second aspect of the invention there is provided a method of effecting relative movement between a first surface and a tubular body, the tubular body having a longitudinal axis and an end surface at one end of the tubular body, the method comprising the steps of:

arranging the first end surface in contact with the first surface;

generating a first travelling surface wave on the end surface, the first travelling surface wave travelling along a first portion of the end surface in a first direction around the end surface; and, while the first travelling surface wave is travelling along the first portion of the end surface, generating a second travelling surface wave on the end surface, the second travelling surface wave travelling along a second portion of the end surface in a second direction around the end surface, the second direction being opposite to the first direction.

The first surface and the end surface may be flat, the method producing relative translation between the first surface and the end surface, or the first surface may be curved, the method producing relative rotation between the first surface and the end surface about an axis other than the longitudinal axis.

Preferably, the tubular body is a tube of piezoelectric material and the steps of generating the first and second travelling surface waves comprise arranging a first group of electrodes adjacent the first portion of the end surface and arranging a second group of electrodes adjacent the second portion of the end surface and applying voltages to the electrodes of the first and second groups in a predetermined sequence.

According to a further aspect of the invention there is provided positioning apparatus comprising:

a base;

a piezoelectric member coupled to the base and extending along a longitudinal axis from the base to a distal end, the piezoelectric member having a first end surface at said distal end;

a movable member supported by the first end surface, the movable member having a first surface arranged in contact with said first end surface;

member movement means arranged to provide controlled elongation of the piezoelectric member in a direction parallel to the longitudinal axis so as to provide adjustment of a position of the movable member relative to the base in a direction parallel to the longitudinal axis; and member rotation means arranged to generate at least one travelling surface wave on the first end surface of the piezoelectric member to provide controlled rotation of the movable member about a rotation axis.

Again, the or each travelling surface wave may be described as a travelling deformation wave. The member movement means may be described as a member movement system, and the member rotation means may be described as a member rotation system. The piezoelectric member supports the movable member.

Preferably, the member movement means is further arranged to provide controlled bending and/or elongation of the piezoelectric member. Thus, the member movement means may provide controlled displacement of the first end surface in at least one direction transverse to the longitudinal axis.

The member movement means may comprise a plurality of electrodes attached to the piezoelectric member and control means arranged to apply voltages to said electrodes of the member movement means. Similarly, the member rotation means may comprise a plurality of electrodes attached to the piezoelectric member and control means arranged to apply voltages to said electrodes of the member rotation means.

In certain preferred embodiments the rotation axis is transverse to the longitudinal axis, and the first surface is spherical or cylindrical.

In certain examples, the piezoelectric member is a tube of piezoelectric material, and the first end surface is substantially annular. The member rotation means is then preferably arranged to generate a first travelling surface wave on the first end surface, the first travelling surface wave travelling along a first portion of the first end surface in a first direction around the first end surface, and, while the first travelling surface wave is travelling along the first portion of the first end surface, to generate a second travelling surface wave on the first end surface, the second travelling surface wave travelling along a second portion of the first end surface in a second direction around the first end surface, the second direction being opposite to the first direction, such that interaction between the first surface and the first and second travelling surface waves effects rotation of the movable member about an axis other than the longitudinal axis.

The member rotation means may comprise a first plurality of electrodes arranged around a first longitudinal segment of the tube and control means arranged to apply voltages to the first plurality of electrodes to generate the first and second travelling surface waves, the first longitudinal segment being proximate the first end. Then, the member movement means may comprise a second plurality of electrodes arranged around a second longitudinal segment of the tube and control means arranged to apply voltages to the second plurality of electrodes to provide controlled bending of the tube, the second longitudinal segment being on the opposite side of the first longitudinal segment to the first end surface.

Preferably, the second plurality of electrodes and control means are arranged to provide controlled displacement of the first end surface in two mutually perpendicular directions transverse to the longitudinal axis and/or controlled displacement in a direction parallel to the longitudinal axis.

In certain preferred embodiments the tube has a second end, opposite the distal end, and a second end surface at the second end, the second end surface being arranged in contact with a surface of the base. The apparatus may then further comprise tube translation means arranged to generate another pair of travelling surface wave on the second end surface, travelling in opposite directions around the second end surface along respective portions of the second end surface. This second pair of waves, on the second end surface, interacts with the base surface to effect translation of the tube over the base surface.

In certain embodiments the base surface and second end surface are flat. The tube translation means may comprises a third plurality of electrodes arranged around a third longitudinal segment of the tube and control means arranged to apply voltages to the third plurality of electrodes, the third longitudinal segment being proximate the second end surface.

In certain embodiments, biasing means are arranged to urge the second end surface against the base surface and/or to urge the first end surface against the first surface.

At least one of the base surface, the second end surface, the first surface and the first end surface may be provided with wear-resistant material, in the form of a coating, a layer, or inclusions in the composition of the tube, for example.

In certain embodiments the movable member may comprises or carry a probe, cantilever, worktip, or some other tool. Alternatively, or in addition, the movable member may comprise a mirror and/or means for mounting a sample.

Another aspect of the invention provides a method of positioning a movable member relative to a base, the method comprising the steps of:

providing a piezoelectric member coupled to the base, the piezoelectric member extending along a longitudinal axis from the base to a distal end and having a first end surface at said distal end;

supporting the movable member on the first end surface, the movable member having a first surface arranged in contact with said first end surface;

providing controlled elongation of the piezoelectric member in a direction parallel to the longitudinal axis so as to provide adjustment of a position of the movable member relative to the base in a direction parallel to the longitudinal axis; and generating at least one travelling surface wave on the first end surface of the piezoelectric member to provide controlled rotation of the movable member about a rotation axis.

In this method, the piezoelectric member may be a tube of piezoelectric material, the first surface may be curved, and the generating step may comprise generating two travelling surface waves travelling at the same time in opposite directions around the first end surface along respective portions of the first end surface so as to rotate the movable member about an axis other than the longitudinal axis.

The tube may have a second end, and a second end surface at the second end, the step of providing the piezoelectric member then comprising arranging the second end surface in contact with a surface of the base, and the method further comprising the step of generating two travelling surface waves travelling at the same time in opposite directions around the second end surface along respective portions of the second end surface so as to translate the tube over the base surface.

Preferably, the method further comprises the step of bending the tube to provide movement of the first end surface in at least one direction transverse to the longitudinal axis.

Another aspect of the invention provides a method of effecting relative movement between a first surface and a tube of piezoelectric material having a longitudinal axis and an end surface, the method comprising the steps of:

providing a plurality of electrodes on the tube;

arranging the first surface in contact with the end surface;

exciting the electrodes in a manner so as to deform the end surface and effect relative movement between the first surface and the tube, the relative movement comprising at least one of:

translation; and rotation about an axis other than the longitudinal axis of the tube.

In certain embodiments the outer surface of the tube is segmented (i.e. provided with a suitable array of electrodes) in order to provide travelling waves, while the inner surface is segmented to provide bending and/or elongation of the tube. While generating travelling wave the inner electrodes may be grounded or kept at a constant potential by means of control electronics. While bending/elongating, the outer electrodes may be kept at a constant potential. Simultaneous independent control may be realised because it is potential difference across the piezoelectric material that affects its deformation.

For example, the inner surface may be segmented with two electrodes, as shown in FIGS. 4 and 5, or with a larger number of electrodes, e.g. 4 or more. The outer surface may be segmented with electrodes in a manner as shown in the accompanying figures. Also, it will be apparent that different longitudinal segments (or portions) of the tube may be segmented in the same way or differently, to suit requirements and the particular application. Thus, the number and arrangement of inner and/or outer electrodes may differ from one longitudinal segment to the next.

Another aspect of the invention provides positioning apparatus comprising:

a base;

a piezoelectric body coupled to the base;

a movable member having a first surface arranged in contact with a surface (which may be referred to as an operational surface) of the piezoelectric body;

a probe carried by the movable member; and a surface wave generating system arranged to generate at least one travelling surface wave on said surface of the piezoelectric body, the at least one travelling surface wave interacting with the movable member to effect relative movement between the movable member and the piezoelectric body so as to provide positional control of the probe relative to the base.

Features of the other aspects of the invention may be incorporated in this aspect, and the further aspects summarised below, with corresponding advantage.

For example, the surface wave generating system may conveniently comprise a plurality of electrodes, which may be attached to the body, and a control system arranged to apply potentials to those electrodes.

Certain embodiments also comprise a distortion control system arranged to apply electric fields to the piezoelectric body to provide controlled distortion of the body so as to provide further positional control of the probe relative to the base.

The body, in certain embodiments, is substantially tubular, but it will be appreciated that other shapes and configurations may be used.

The surface of the body may be arranged such that the surface wave generation system is operable to generate at least one travelling surface wave to provide controlled translation of the body towards and away from the base (i.e. the "operational" surface or surfaces of the body, on which travelling surface waves are generated, may in some examples be inclined or substantially perpendicular to the base).

In certain embodiments, the body comprises a slot, the movable member is received in the slot, and the operational surface of the body is a side surface of the slot. The movable member may engage a plurality of such operational surfaces.

In alternative embodiments, the body is tubular, and the operational surface of the body is an annular end surface. Travelling waves in a common direction around the end surface may be generated to rotate the movable member. Travelling waves in opposite directions along different portions of the end surface may be used to rotate and/or translate the movable member.

The piezoelectric body may further comprise a base surface arranged in contact with a surface of the base, and the surface wave generating system may be further arranged to generate at least one travelling surface wave on the base surface to interact with the base to effect relative movement between the body and the base. The body may thus be rotated on the base and/or may be translated over the base (in other words, the base of the body may be controlled to "walk" over the base and hence provide relatively coarse movement of the movable member, and hence of the carried probe(s), relative to the base.

In certain embodiments, the apparatus (which may, for example, be referred to as micro- or nano-manipulation apparatus) further comprises biasing means arranged to urge the first surface and the operational surface of the body together, and/or biasing means arranged to urge the body and base together.

The movable member may carry a plurality of probes.

Another aspect of the invention provides a method of providing independent relatively fine and relatively coarse positional control of a movable member, the method comprising the steps of:

coupling the movable member to a body of piezoelectric material and applying electric fields to said body to provide controlled distortion of the body so as to provide relatively fine positional control of the movable member; and arranging a surface of the movable member in contact with a surface of a body of piezoelectric material and generating at least one travelling surface wave on said surface of the body of piezoelectric material, the at least one travelling surface wave interacting with the movable member to effect relative movement between said surfaces to provide relatively coarse positional control of the movable member.

Separate piezoelectric bodies may be used, but in certain embodiments a common piezoelectric body is used to provide the relatively coarse and the relatively fine positional control. This common body may be arranged to support the movable member, which may itself carry one or more tools, probes, tips, mirrors, other optical components, samples etc.

Another aspect provides positioning apparatus comprising:

a base;

a piezoelectric member coupled to the base;

a movable member supported by the piezoelectric member, the movable member having a first surface arranged in contact with a surface of the piezoelectric member;

a distortion control system arranged to apply electric fields to the piezoelectric member to provide controlled distortion of the piezoelectric member so as to provide relatively fine positional control of the movable member relative to the base; and a surface wave generation system arranged to generate at least one travelling surface wave on said surface of the piezoelectric member to interact with the movable member so as to effect relative movement between the surfaces and thereby provide relatively coarse positional control of the movable member relative to the base.

Again, the piezoelectric member may further comprises a base surface arranged in contact with a surface of the base, and the surface wave generation system may be further arranged to generate at least one travelling surface wave on the base surface to interact with the base to effect relative movement between the piezoelectric member and the base.

BRIEF DESCRIPTION OF THE DRAWINGS

Embodiments of the invention will now be described, by way of example, with reference to the accompanying drawings, of which:

FIG. 6 illustrates another use of piezoelectric tube to produce fine movement in a nominal X direction;

FIG. 7 is a schematic representation of the electrodes arrangements on the tube in FIG. 6;

FIG. 8 illustrates the use of a piezoelectric tube to provide fine movement in nominal X and Y directions;

FIG. 9 is a schematic representation of the electrode arrangement on the tube of FIG. 8;

FIGS. 18 to 21 illustrate the electrode arrangements around piezoelectric tubes and the sequences of excitation of the electrodes to generate pairs of travelling surface waves travelling in opposite direction around the end surfaces of the piezoelectric tubes;

FIGS. 22a to 22d illustrate the movement of the peaks of the travelling surface waves generated according to FIG. 19;

FIGS. 22e to 22h illustrate the resultant rotation of a body supported on the end surface of the piezoelectric tube with electrodes excited according to FIG. 19;

FIG. 36 illustrates an end of a piezoelectric tube and electrode arrangement suitable for use in embodiments of the invention;

FIG. 37 is a schematic end view of the tube and electrode arrangement from FIG. 36;

FIGS. 38a to 38c are highly schematic representations of travelling surface waves produced on the surface of the tube of FIGS. 36 & 37 with the electrodes excited in accordance with the sequence illustrated in FIG. 37;

FIG. 39 is a schematic perspective view of positioning apparatus embodying the invention;

FIG. 40 is a schematic end view of the apparatus of FIG. 39;

FIGS. 41 and 42 are schematic cross sections of the apparatus of FIG. 40 along lines A-A and B-B respectively;

FIGS. 43a to 43c illustrate rotation of the supported body of FIG. 39 as a result of travelling surface waves generated on the surface of the supporting body;

FIG. 44 is a highly schematic representation of an alternative piezoelectric tube and electrode arrangements suitable for use in embodiments of the invention;

FIG. 45 is a schematic end view of the tube and electrode arrangement from FIG. 44;

FIG. 53 illustrates yet another piezoelectric tube and electrode arrangement suitable for use in embodiments of the invention;

FIGS. 54 and 55 are schematic plan and side views, respectively, of probe-positioning apparatus embodying the invention;

FIGS. 56 and 57 are schematic plan and side views, respectively, of another probe-positioning apparatus embodying the invention;

FIGS. 58 and 59 are schematic plan and front views, respectively, of a multi-probe positioning apparatus embodying the invention;

FIGS. 60 and 61 are schematic plan and front views, respectively, of another multi-probe positioning apparatus embodying the invention;

FIGS. 62, 63 and 64 are schematic plan, front and side views, respectively, of another probe-positioning apparatus embodying the invention; and FIG. 65 is a schematic front view of another probe-positioning apparatus embodying the invention.

DETAILED DESCRIPTION OF PREFERRED EMBODIMENTS

Figure 1:
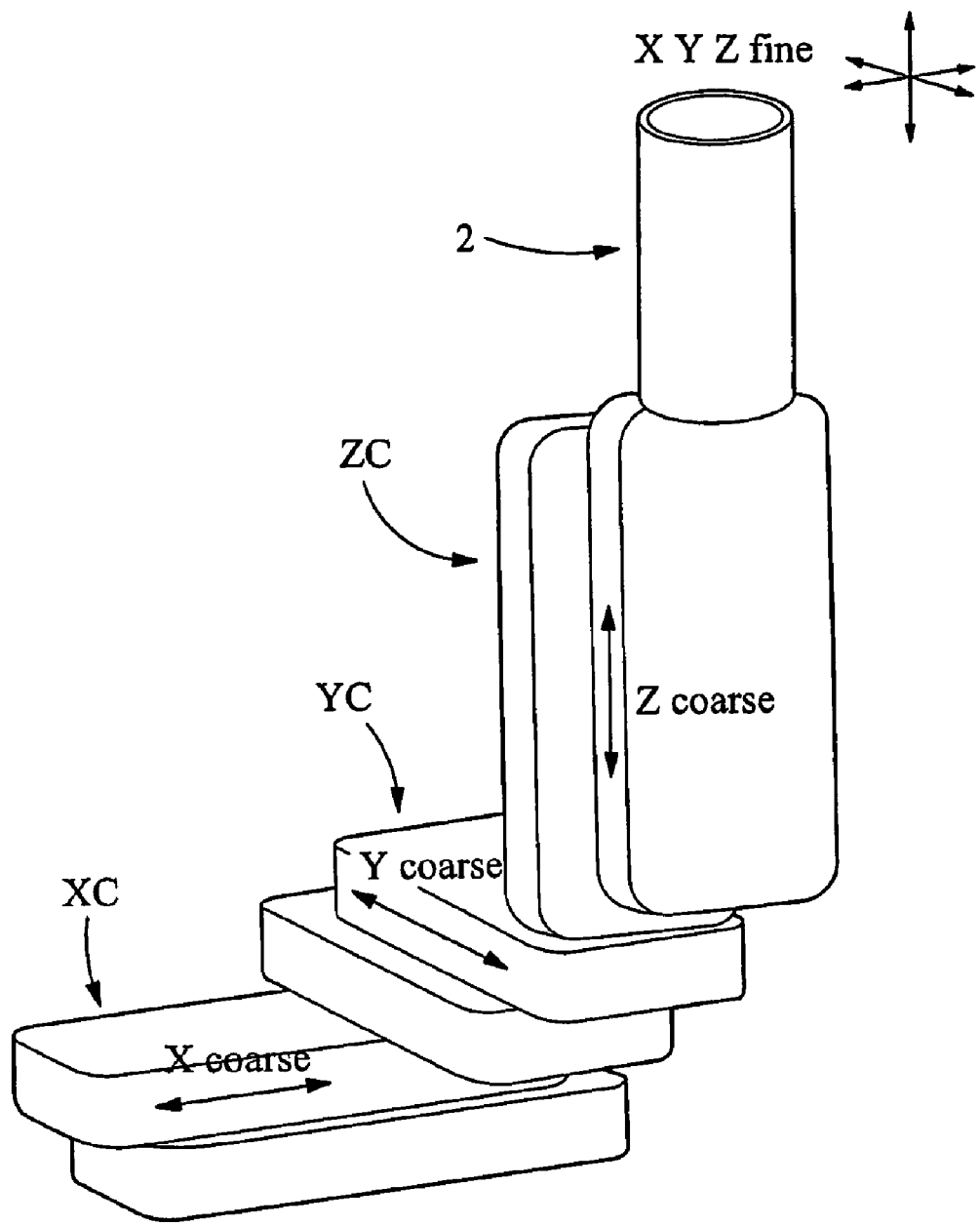
FIG. 1 is a schematic representation of positioning apparatus according to the prior art.
Figures 2, 3:
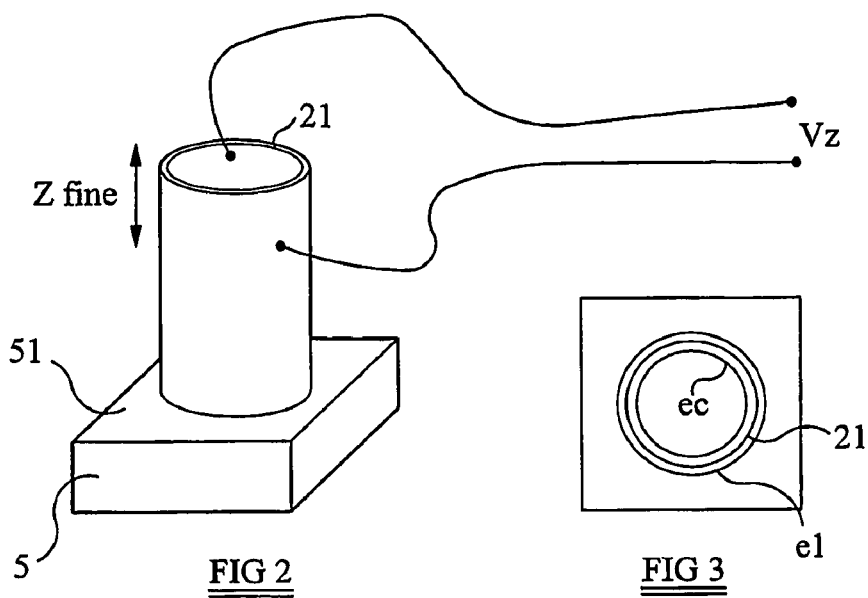
FIG. 2 illustrates the use of a piezoelectric tube to provide fine movement in a nominal Z direction.
FIG. 3 is a schematic representation of the arrangement of electrodes on the tube of FIG. 2.

FIGS. 2 & 3 illustrates a technique for using a tube of piezoelectric material to produce fine movement in a nominal Z direction. This technique may be used in embodiments of the invention. The tube is coupled to a surface 51 of a base 5. A first circular electrode e1 is attached to the outer surface of the tube, and a second circular electrode EC is attached to the inner surface of the tube. The piezoelectric material of the tube is polarized radially and a voltage V is applied between the electrodes deposited outside and inside the tube. This applies an electric field to the piezoelectric material which results in elongation or shrinkage of the tube (according to the sign of the applied potential difference) in a direction parallel to the longitudinal axis of the tube (i.e. in the nominal Z direction in the figure). Although in FIG. 1 the circular (or ring) electrodes are shown as extending along the entire length of the tube, it will be appreciated that in embodiments of the invention they may be confined to just a longitudinal segment of the tube (i.e. to just a portion of its length).

Figures 4, 5:
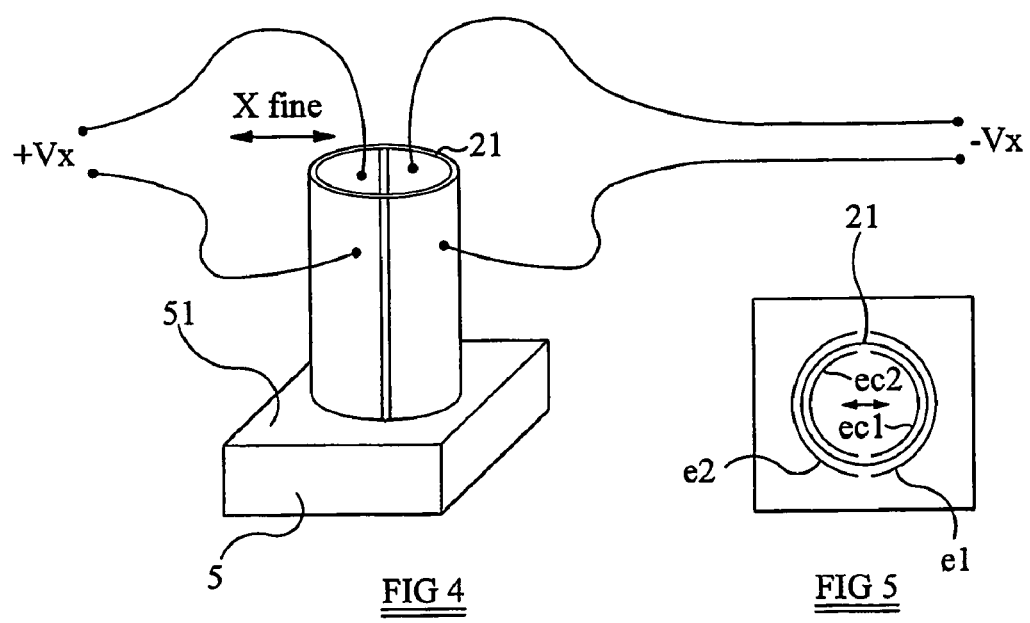
FIG. 4 illustrates the use of a piezoelectric tube to provide fine movement in a nominal X direction.
FIG. 5 is a schematic representation of the electrode arrangement on the tube of FIG. 4.

FIGS. 4 & 5 illustrates another technique which may be used in embodiments of the invention to achieve fine movement in a nominal X direction with a piezoelectric tube. If this technique, four electrodes are attached to tube. These four electrodes are a first outer electrode e1 and a first inner electrode ec1 (which are arranged to extend around the outer and inner surfaces respectively of one half of the tube) and a second outer electrode e2 and a second inner electrode ec2 (which are arranged to extend around the opposite half of the tube). Voltages of opposite sign are then applied to the two halves of the tube. This makes one half of the tube extend and the other shrink. This results in a small amount of bending of the tube which results in the end surface 21 moving in the X direction, as indicated by the arrow labelled "X fine" in the figures.

Moving on to FIGS. 6 & 7, these show an alternative technique of achieving bending of the tube to produce fine displacement of the end surface in the X direction. In this technique, a single inner electrode ec is used, and only the outer surface is segmented into first and second outer electrodes e1 and e2. The inner electrode electric potential can be left floating or grounded. Bending of the tube can be achieved by application of a differential voltage between the first and second outer electrodes e1 and e2. It will also be appreciated that the two halves of the tube can be independently driven if only one voltage is varied, the voltage to the other outer electrode being held constant. It will also be appreciated that rather than using a single inner electrode and two outer electrodes to achieve fine X control, a single circular outer electrode could be used in conjunction with a segmented inner electrode.

FIGS. 8 & 9 illustrate a technique for achieving fine movement control in three mutually perpendicular directions (the nominal X, Y and Z directions in the figure, the Z direction being perpendicular to the surface 51 of the base 5 and the X and Y directions being parallel to the base surface 51). In this technique, four electrodes e1, e2, e3 and e4 are arranged around the tube outer surface and a common inner electrode is arranged around the inner surface of the tube. This electrode arrangement affectively divides the tube into four independently controllable tube segments. Application of a potential difference between the opposed electrodes e1 and e3 provides the bending of the tube to displace the end surface in the Y direction, and an application of a potential difference between the electrodes e2 and e4 produces bending of the tube which displaces the end surface 21 in the nominal X direction. In addition, to the application of the differential voltages to achieve bending, or as an alternative, a voltage can be applied to all four outer electrodes simultaneously with respect to the common inner electrode to control elongation or shrinkage of the tube in the longitudinal direction, i.e. to achieve fine movement control of the end surface 21 in the Z direction. Thus, if a probe or sample is coupled to the end surface 21 then the tube and electrode arrangement can be used to achieve fine positioning of the probe or sample in the X, Y and Z directions relative to the base 5 by application of appropriate voltages to the electrodes.

Figures 10, 11:
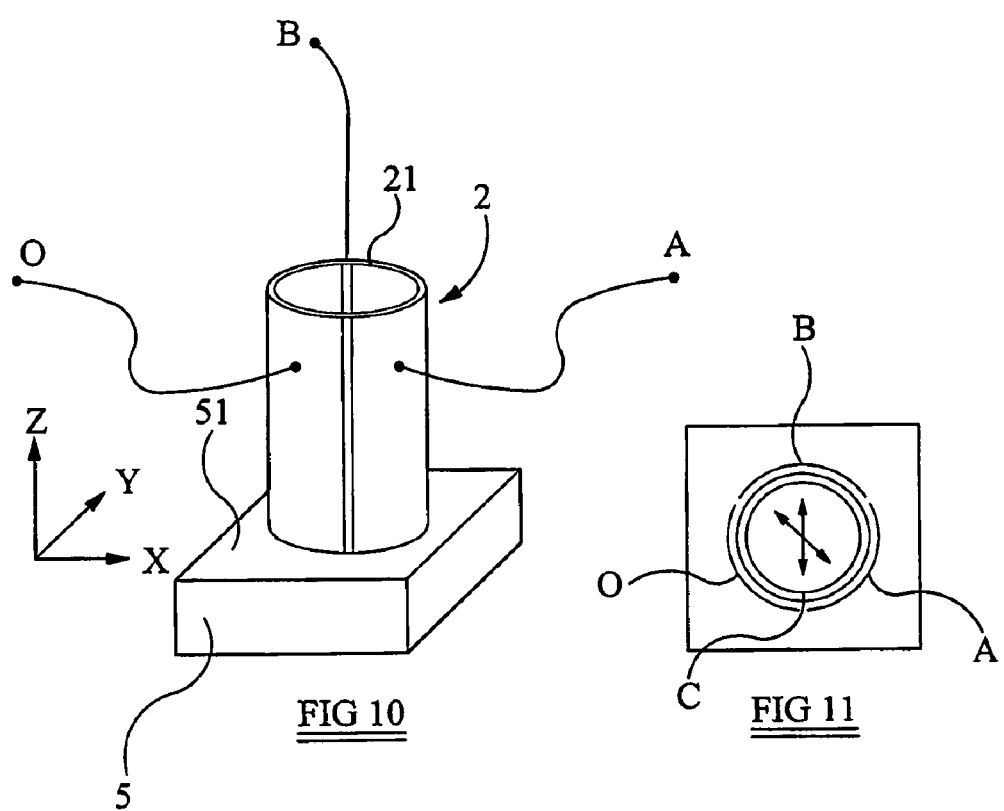
FIG. 10 illustrates an alternative technique for using a piezoelectric tube to produce fine movements in nominal X and Y directions.
FIG. 11 is a schematic representation of the electrode arrangement on the tube of FIG. 10.

FIGS. 10 & 11 illustrate an alternative technique of achieving fine positioning of the end surface 21 in the X, Y and Z directions. In this arrangement only outer electrodes A, B and O are arranged around the outer surface of the tube, with a single inner electrode C on the inner surface. Thus, the electrode arrangement provides control of only three independent segments. Again, application of a common voltage to all three outer electrodes with respect to the inner electrode can be used to provide fine Z movement control. Fine movement control of the end surface 21 in the X and Y directions is achieved by the application of suitable potential differences between the outer electrodes A, B and O.

Referring now to FIGS. 12a to 12g, these illustrate a technique for producing a travelling surface wave on the surface of a body of piezoelectric material, this technique being suitable for use in embodiments of the invention. For simplicity, in FIGS. 12a to 12g the piezoelectric body is a flat piezoelectric sheet PS having an upper edge surface 21. The figures show one side of the sheet PS on which are provided three electrodes e1, e2 and e3. The reverse side of the sheet is not shown in the figures, but is provided with a single electrode extending over the entire reverse surface and which is held at a constant potential. The three electrodes on the front face of the sheet can be thought of as dividing the sheet into a number of independently controllable segments. In this example, the application of a voltage greater than the potential of the reverse electrode to one of the front electrodes causes a dimensional change of the piezoelectric material of the respective segment which makes that segment extend in both the vertical and horizontal directions in the figure. Thus, an application of a voltage sequentially to the electrodes in a chosen direction produces a wave of the upper surface 21 which travels along the upper surface 21. This wave comprises a deformation of the upper surface 21.

Figure 12A:
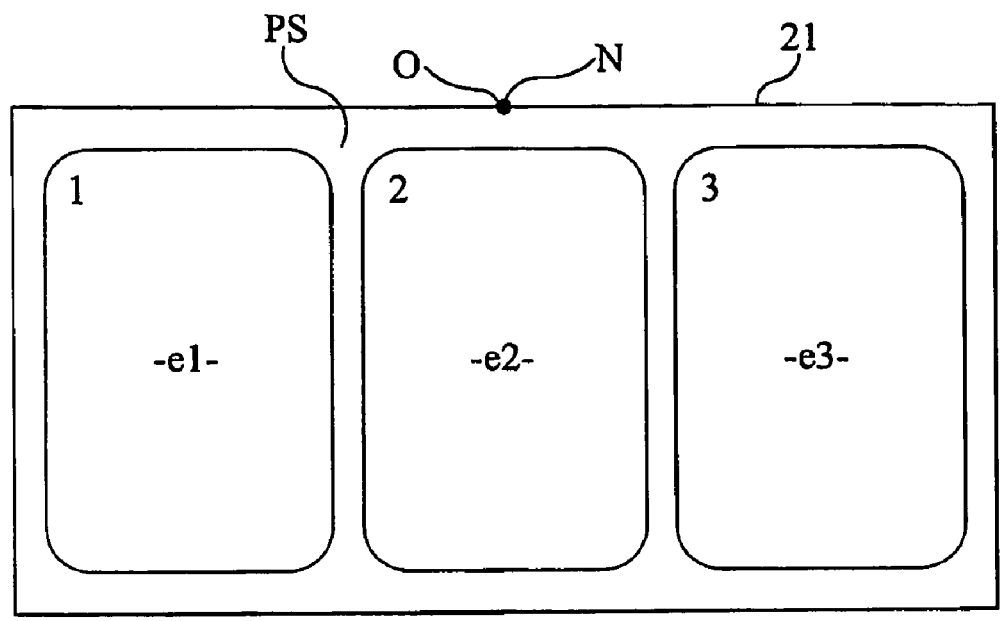
FIGS. 12a to 12g illustrate the generation of a travelling surface wave on a surface of a sheet of piezoelectric material, the travelling surface wave being of the type suitable for use in embodiments of the invention.
Figure 12B:
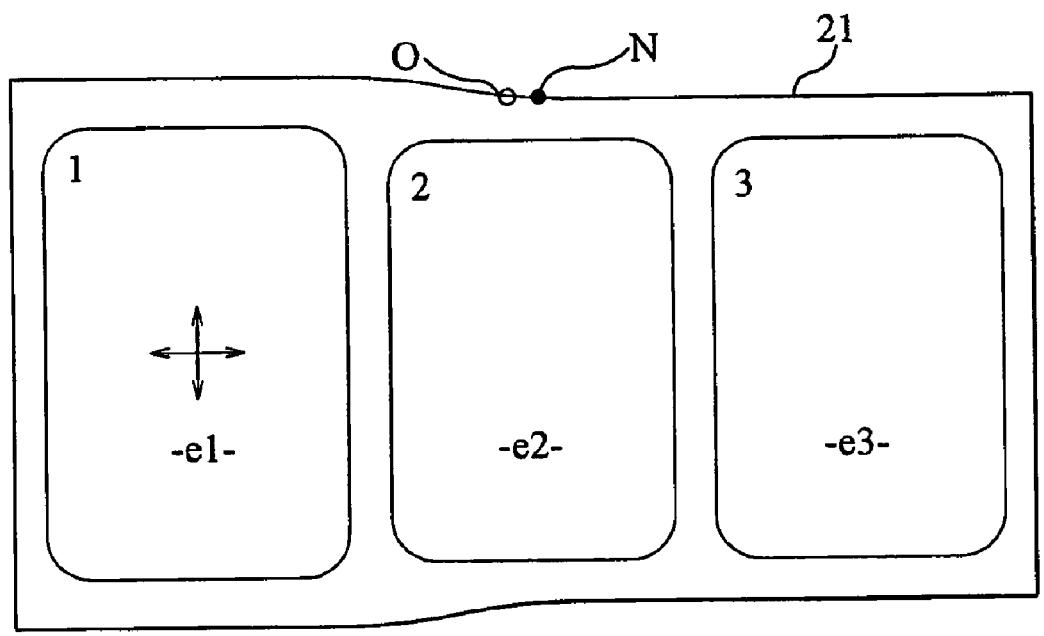
Figure 12C:
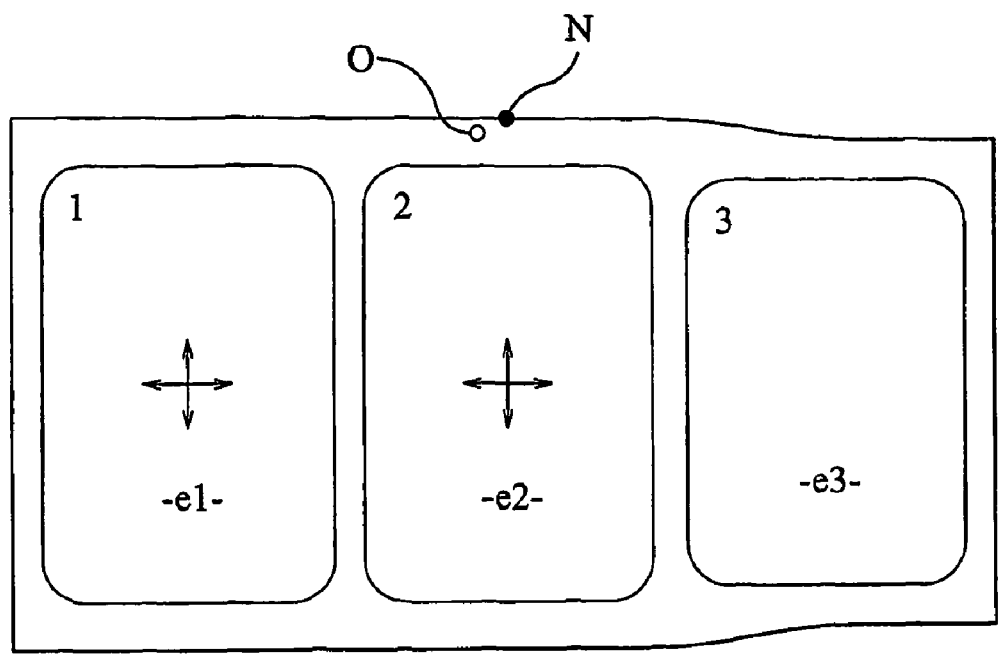
Figure 12D:
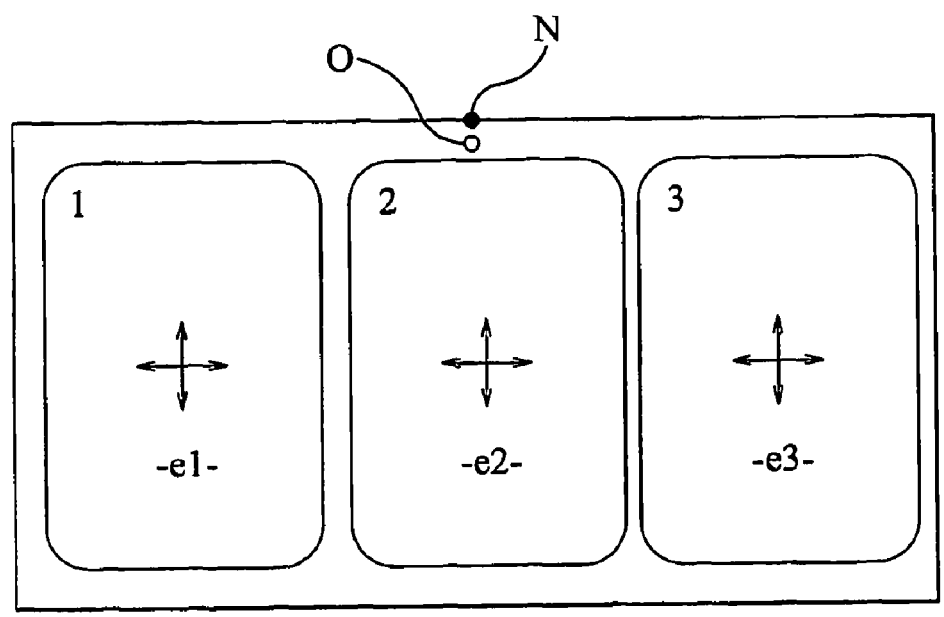
Figure 12E:
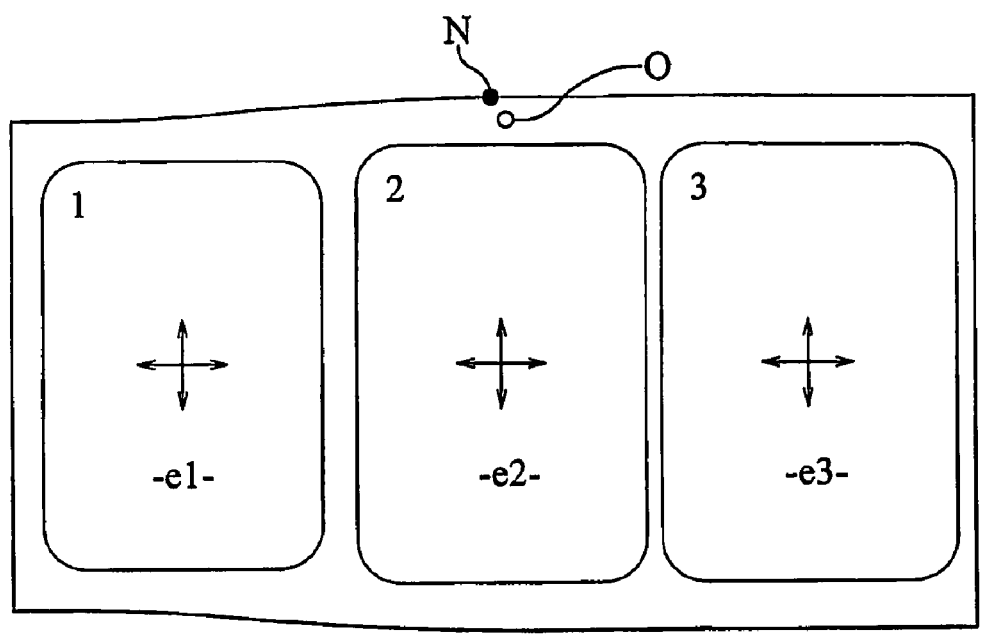
Figure 12F:
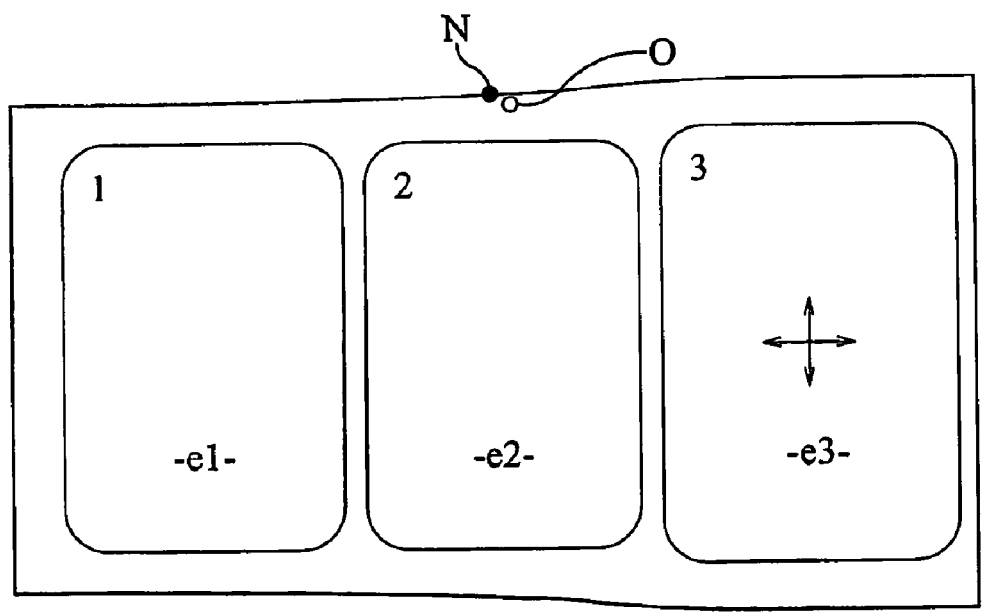
Figure 12G:
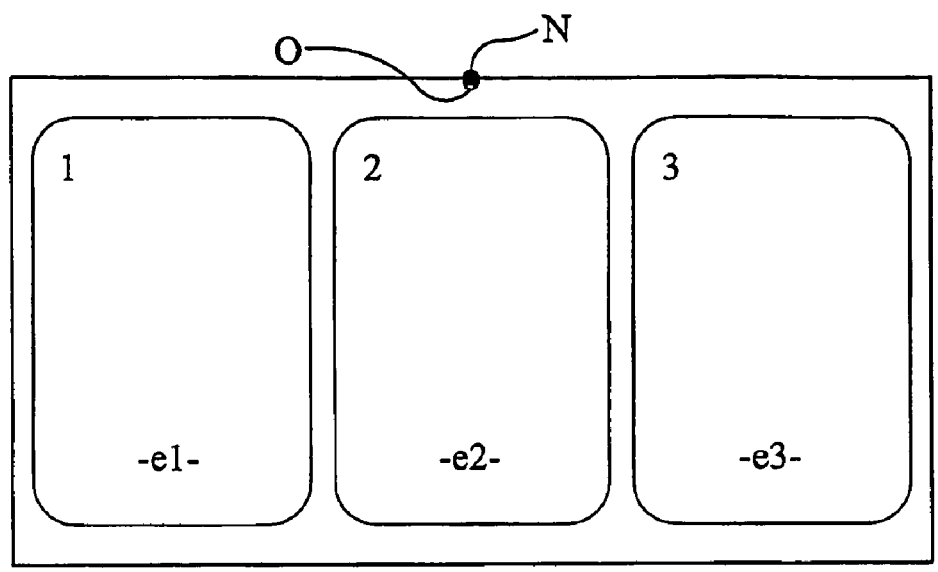
Figure 13:
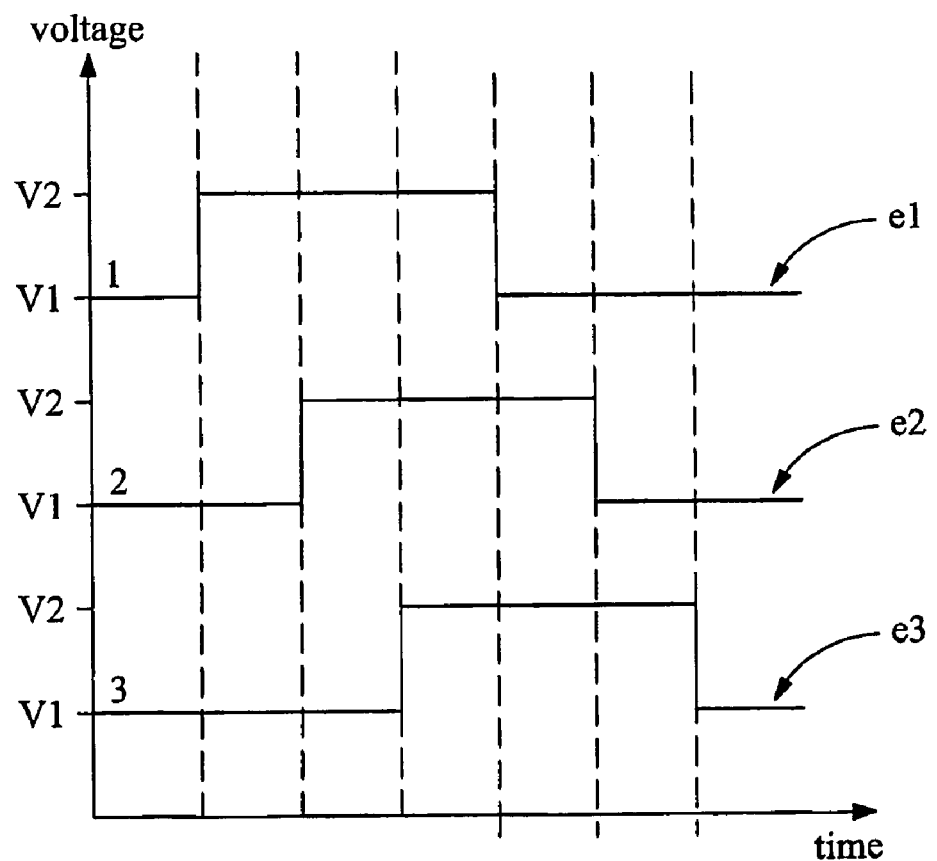
FIG. 13 illustrates the voltages applied to the electrodes in FIGS. 12a to 12g to generate the travelling surface wave.

FIGS. 12a to 12g illustrate the sequence of steps in the cycle for generating the travelling surface wave. FIG. 12a shows the beginning of the cycle in which none of the three electrodes is excited. A particle N on the surface 21 of the sheet is shown at an initial, starting position O. FIG. 12b shows the next step in the cycle in which an excitation voltage (i.e. potential) has been applied just to the first electrode e1. The voltage applied to the first electrode has effected a dimensional change in the piezoelectric material subjected to the resultant electric field, such that the corresponding segment of the sheet has extended in both the vertical and horizontal directions in the figure. The arrows superimposed on the first electrode e1 indicate the directions of the sheet expansion. This expansion of the first segment has resulted in the particle N (which may also be described as a point on the edge) moving to the right in the figure, relative to the starting position O. FIG. 12c shows the next step in the cycle in which the excitation voltage is applied to both the first and second electrodes e1 and e2 but not to the third electrode. Application of the voltage to the second electrode in addition to the first has resulted in the particle N lifting upwards, so that it is now displaced upwards and to the right from the starting position O. FIG. 12d shows the next step in the cycle, in which the excitation voltage is now applied to all three electrodes. The additional excitation of third electrode has resulted in the particle N moving to the left in the figure, so that it is now positioned directly above its starting position O (i.e. the excitation of the third electrode has resulted in the particle N moving to the left compared with its position if FIG. 12c). In the next step of the cycle, as illustrated by FIG. 12e the first electrode e1 has been returned to its initial voltage (i.e. it is no longer excited) but the second and third electrodes remain excited. The return of the first electrode voltage to its initial value has resulted in the particle N falling slightly and moving to the left compared with its position the preceding step. In the next step, illustrated by FIG. 12f, the excitation voltage has been removed from the second electrode e1 such that only the third electrode e3 remains excited. The particle N on the surface has fallen yet further. Finally, as shown in FIG. 12g, the third electrode e3 is returned to its initial voltage so that no electrode is now excited and the sheet has returned to its initial state, as at the beginning of the cycle. The particle N on the surface has been returned to its initial position O. Thus, the application of control voltages to the series of electrodes in a predetermined sequence has resulted in a generation of a travelling surface wave on the surface 21 of the sheet. This surface wave comprises a deformation of the surface that has components in both the vertical and horizontal directions. The particle N on the surface 21 makes a cyclic motion as the travelling wave passes by. FIG. 13 illustrates the timing sequence of the three control voltages applied to the electrodes in the wave generation cycle illustrated by FIGS. 12a to 12g. For each electrode, the excitation voltage is denoted by V2, and the initial (non-excitation voltage) is denoted by V1.

Figure 14:
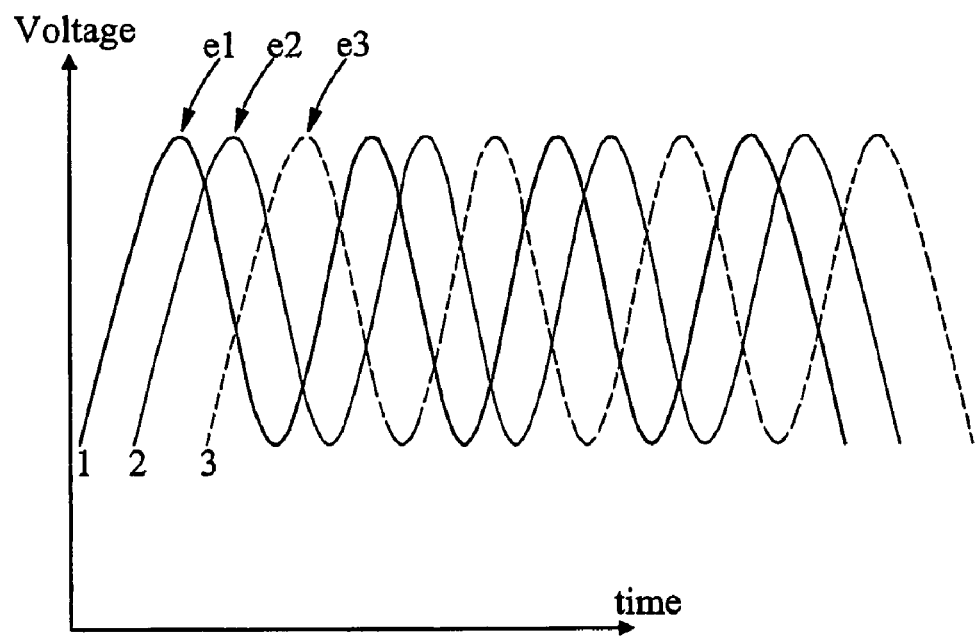
FIG. 14 illustrates another set of control voltages suitable for application to the electrodes shown in FIGS. 12a to 12g to generate a travelling surface wave.

Thus, travelling surface waves on the surfaces of piezoelectric buddies can be generated in embodiments of the invention by suitable application of square-wave control voltages. Alternatively, control voltages having a different form may be used. For example, sinusoidal control voltages may be used, as illustrated by FIG. 14. These control voltages may be generated by a three-phase generator, and applied to the three electrodes e1, e2 and e3 of the arrangement shown in FIGS. 12a to 12g to generate suitable travelling surface wave on surface 21. This can be thought of, as can the use of the control voltages shown in FIG. 13, as driving "caterpillar motion" on the upper surface 21. By applying the control voltages of FIG. 14 to the three-electrode arrangement, a travelling wave travels along the edge of the sheet and all points on the edge of sheet undergo motion which is approximately elliptic. Thus the edge makes a caterpillar-like motion and a flat object pressed against the piezoelectric sheet edge (i.e. resting on the surface 21) would be moved by the caterpillar wave.

Although the generation of a travelling surface wave has been described with reference to a three-phase system, it will be appreciated that in alternative embodiments a different number of phases may be used. The minimum number of phases that can be used is two, and examples of this will be described below. Also, a number of phases greater than three may be used. Thus, the number of segments composing a period of the travelling wave can be two, three, or more.

The travelling wave generated on the surface 21 of the piezoelectric body illustrated by FIGS. 12a to 12g is an example of a surface wave on a solid body that may be used in embodiments of the invention. The higher the frequency of the control voltage applied to the electrodes (e.g. the voltage in FIG. 14) the faster the surface wave travels. At a certain frequency, depending on the geometry of the piezoelectric body and the arrangement of the electrodes, a resonance is achieved. In that case the surface wave may be considered similar to a Rayleigh wave. In contrast to piezoelectric motors working best at their resonant frequency, devices embodying the invention work best at frequencies somewhat below the resonant frequency. This is because two travelling waves (travelling along separate respective portions of the surface) should not penetrate each other. In resonance the waves travel outside the area defined by their electrodes (similar to the phenomenon of inertia in mechanics).

Figure 15:
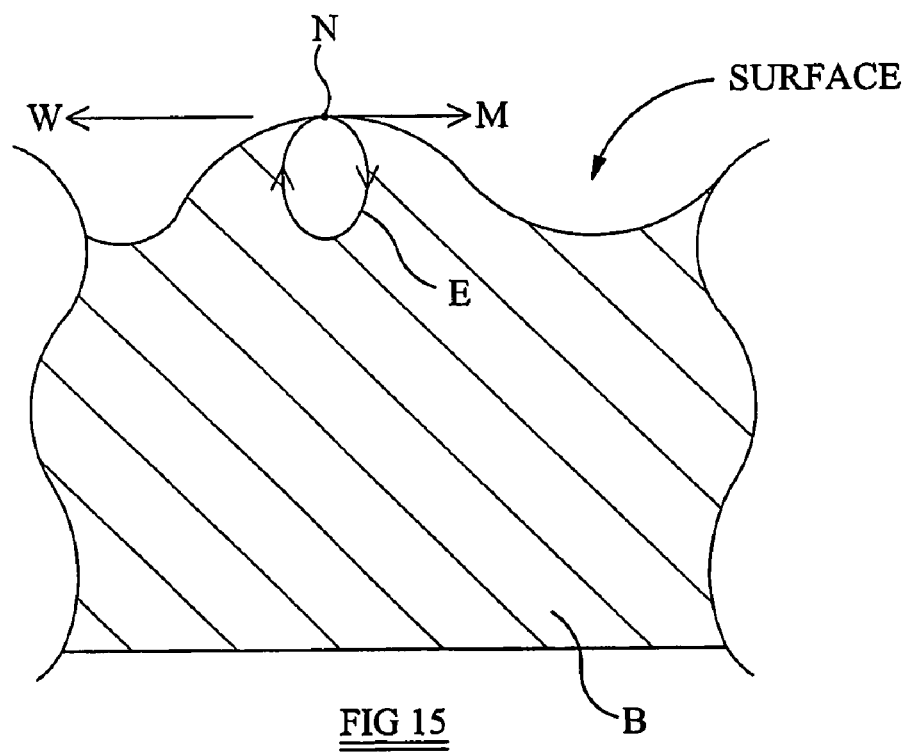
FIG. 15 illustrates a Rayleigh surface wave travelling along the surface of a solid and the motion of a particle on the surface of the solid body.

A snap-shot of a surface wave travelling along the surface of a solid body B in an embodiment of the invention is shown in highly schematic form in FIG. 15. A single peak of the wave is shown in the figure, and the direction of propagation of the travelling surface wave is shown by arrow W. A characteristic of this surface wave is that particles on the surface of the solid body B undergo elliptic motion as the travelling wave passes by. As such, this surface wave can be regarded as being of the Rayleigh-type. A single particle N on the surface is shown in the figure, and its elliptical path is denoted by reference E. The particle N in this snap shot is located at the peak at the travelling wave and its instantaneous motion is denoted by arrow M. As can be seen from the figure, this motion (at the top of the elliptical path) is in the opposite direction to the wave propagation direction W. Thus, if a surface is placed on top of the body B in frictional engagement with the upper surface, then the interaction between the travelling surface wave and the supported surface is to drive the supported surface in the direction opposite to the wave propagation direction W. In simplistic terms, each peak of the travelling wave lifts the supported surface and urges it in the reverse direction compared to the wave propagation direction W. Such surface waves may be generated in various forms of solid bodies, and are not limited to piezoelectric materials. Thus, although FIGS. 12a to 12g illustrated the production of a travelling surface wave in a piezoelectric body by application of suitable control voltages to an array of electrodes, alternate embodiments of the invention may utilise materials other than piezoelectric materials and the surface waves may be generated on their surfaces in a different ways. For example, embodiments of the invention may utilise a body (such as a tube) of magnetostrictive material, in which case the generation of travelling surface waves on the surface of the body may be achieved by suitable application of magnetic fields. It will be appreciated that piezoelectric materials and magnetostrictive materials are merely examples, and embodiments of the invention are not limited to using just these.

As will be appreciated from the above description, a travelling surface wave can be generated along a portion of a surface of a piezoelectric body by arranging electrodes to divide the portion into three segments and then exciting the segments with suitable control voltages. However, it will be appreciated that the portion can be divided into more than three segments. In such cases, the time lag between the control voltages may be 360° divided by the number of segments in a period. The segments may, in certain embodiments, form more than one period. Along a particular portion of the surface on which the travelling wave is generated, it is advantageous to have an electrode arrangement defining three periods of the travelling wave since this can provide three supporting points (peaks of the travelling waves) at any moment in time.

To generate a suitable travelling surface wave along a portion of a surface of a piezoelectric body the minimum number of segments into which the portion is divided by electrodes is two. In such cases, the time lag between the control voltage applied to the first electrode and the control voltage applied to the second electrode should be different from 180°. A time lag of 90° is advantageous because when the first segment is maximally lifted, the second electrode has the highest velocity of extension. This develops the maximum lateral velocity of the first segment edge. The wave frequency should be fast enough to prevent sticking of the supported moving object to the piezoelectric sheet edge when the edge lowers down and returns back.

Figure 16:
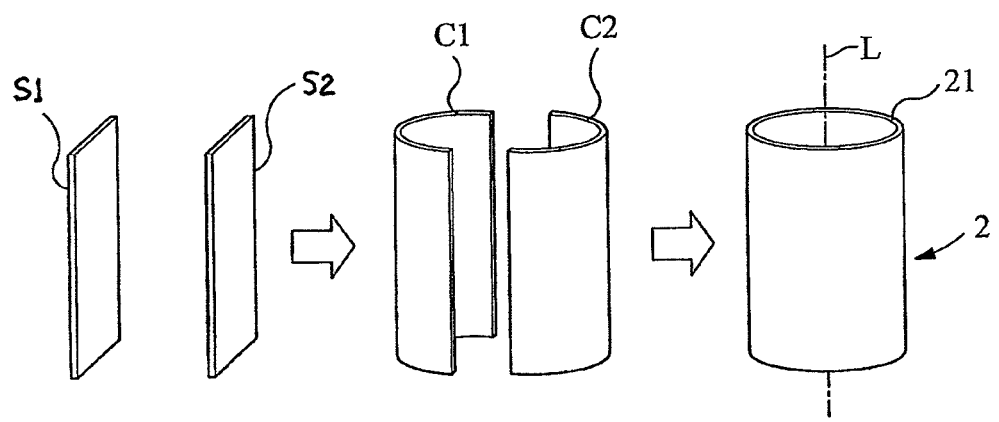
FIGS. 16 and 17 illustrate the composition of a piezoelectric tube suitable for use in embodiments of the invention.
Figure 17:
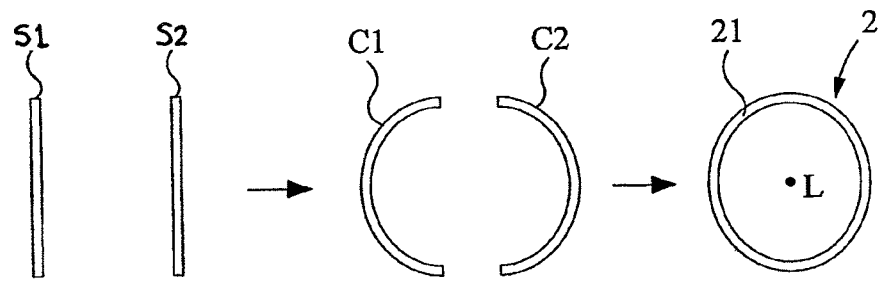

For simplicity, FIGS. 12a to 12g show the generation of a travelling surface wave on the surface of a straight sheet of piezoelectric material. However, it will be appreciated that in certain embodiments of the invention, a piezoelectric tube is used, and relative motion between the tube and a surface with which the tube is in contact is achieved by generating travelling waves which travel in opposite directions around an end surface of the tube, each travelling wave travelling along a respective portion of the end surface. A piezoelectric tube can be regarded as two piezoelectric sheets such as the sheet illustrated in FIGS. 12a to 12g, but bent in opposite ways to form two hemi-tubes. Using a suitable arrangement of electrodes on each hemi-tube and appropriate control voltages, a surface wave in one hemi-tube is arranged to travel in a clockwise direction, and a surface wave in the other hemi-tube is arranged to travel in the counter clockwise direction. FIGS. 16 and 17 illustrate how a piezoelectric tube 2 may be regarded as a combination of two hemi-tubes C1, C2 formed from two piezoelectric sheets S1, S2. These figures are to aid understanding only, and are not to be regarded as representing a method of construction. It will be appreciated that piezoelectric tubes suitable for use in embodiments of the invention will more typically be formed from polycrystalline piezoelectric material, cast in cylindrical form or machined from a larger body of material.

In certain embodiments of the invention, an object is pressed against the end surface 21 of a piezoelectric tube 2 of the type illustrated in FIGS. 16 and 17. Generation of travelling surface waves travelling in opposite directions around the end surface 21, but along respective halves of the tube, results in lateral movement of the object, or rotation of the object about an axis other than the longitudinal axis L of the tube, depending on the shape of the object surface with which the tube end surface 21 is in contact. For example, the object may be flat, spherical, or cylindrical. Alternatively, the object may have a different overall shape (and may comprise a number of different components), in which case the object has an operational surface for frictional engagement with the end surface 21 of the tube 2, that operational surface being flat, spherical or cylindrical (it will be appreciated that by "spherical" or "cylindrical" it is meant that the operational surface may comprise a section, or portion, of a spherical or cylindrical surface; in other words, the operational surface is not necessarily a complete spherical or cylindrical surface).

In certain preferred embodiments the object and piezoelectric tube are fitted, in the sense that the shape of the operational surface of the object and the shape of the end surface 21 of the tube correspond to each other as closely as possible. In other words, the shape of the supporting surface 21 should conform to that of the object surface with which it engages. The fit between the object and the tube surfaces is preferably arranged such that voids between them (or other deviations from the ideal shape) are no larger than the amplitude of the travelling surface waves generated on the tube surface 21. In certain embodiments piezoelectric tubes having lengths in the range of a few millimeters to a few centimeters, and diameters in the range of a few millimeters to a few centimeters, are used and the amplitudes of the travelling waves generated on the tube surface are in the region of several micrometers. In such embodiments, and in others, a suitable fit may be achieved between the tube and the supported object by lapping the operational surface of the object against the end surface 21 of the tube with abrasive paste (i.e. a good fit may be achieved by grinding).

Referring now to FIG. 18, this illustrates the generation of opposing travelling surface waves in an embodiment of the invention. The figure is highly schematic and shows an end surface 21 of a piezoelectric tube. A ring of twelve electrodes is arranged around the outer surface of the tube. A single, common central electrode may be used, although this not shown in the figure. The electrodes are evenly spaced around the circumference of the tube, so as to permit application of electric fields to selected segments of the tube. In this example, there are twelve electrodes, dividing the tube into twelve segments, and each electrode 3 is connected to a respective output from a 3-phase generator. The numbering (1, 2, 3) next to the electrodes illustrates the sequence in which they are excited to generate suitable travelling waves on the surface 21. The numbering can also be considered to represent the positions of the peaks of the travelling surface waves at first, second and third points respectively in the wave-generation cycle. Application of the control voltages to the twelve electrodes results in a first travelling surface wave travelling in a counter clockwise direction around a first portion 211 of the end surface 21 and, at the same time, the generation of a second travelling surface wave travelling in the clockwise direction around a second portion 212 of the end surface 21. The motion of the first travelling surface wave is indicated generally arrow A1 and the motion of the second wave is indicated generally be arrow A2. In this example, the first and second portions 211, 212 do not overlap, and each represent half of the end surface 21, such that together they comprise the entire end surface 21. In certain embodiments of the invention an object may be supported on the end surface 21, the object having a flat surface arranged in contact with the end surface 21. In such embodiments, the first and second travelling waves interact with the object surface so as to translate the object in the X direction, without causing any rotation. In alternative embodiments the object may have a spherical surface arranged in contact with the end surface 21. In such cases the travelling waves interact with the spherical surface so as to rotate the body about an axis parallel to the Y axis.

FIG. 19 illustrates the use of the same piezoelectric tube and electrode arrangement from FIG. 18 to produce travelling waves suitable for moving a supported object in a different direction. As can be seen, the electrodes are excited in a different sequence such that the first and second portions 211 and 212 of the end surface along which the travelling waves are generated are diametrically opposed along the X axis, rather than along the Y axis as was the case in FIG. 18. The numbers 1, 2, 3 next to the electrodes again represent the positions of the peaks of the travelling waves at first, second and third points, respectively, on the cycle. The travelling surface waves generated in FIG. 19 would interact with a flat object surface to translate the object in the negative Y direction of the figure, and would interact with a spherical object surface to rotate the object about an axis parallel to the X axis.

It will be appreciated from FIGS. 18 and 19 that the generation of the first travelling wave is achieved by appropriate sequential excitation of a first group of electrodes spaced around a section of the tubes circumference, and the second travelling wave is generated by appropriate excitation of a second group of electrodes spaced around a second section of the circumference. In these examples, the first and second groups of electrodes have two electrodes in common (in FIG. 18 the shared electrodes are the top and bottom electrodes, and in FIG. 19 the electrodes shared by the groups are those at the extreme left and extreme right). In alternative embodiments, however, the groups of electrodes used to produce the two travelling waves may be completely separate.

From FIGS. 18 and 19 it will be appreciated that the use of twelve electrodes (i.e. the twelve-segment configuration) is particularly advantageous because it allows positioning of a supported object in perpendicular directions. Equivalently, if the piezoelectric tube were resting on a base, with the end surface 21 in contact with a base surface, then the twelve-segment configuration enables translation of the tube in perpendicular directions over the base surface.

A further advantage of the twelve-electrode configuration shown in FIGS. 18 and 19 is that any time during the wave generation cycle, there are four wave peaks (i.e. high points) for engaging a supported object surface or the surface of a base.

Referring now to FIGS. 20 and 21. These illustrate the use of 10 electrodes (i.e. 10-segment configuration) to generate opposing travelling surface waves along respective portions of the end surface 21 of a tube. In the excitation sequence illustrated in FIG. 20, at the beginning of the wave generation cycle (step 1) there are three peaks on the surface. At the second step (2) there are again three peaks. However, at each of the third and fourth steps in the cycle (3, 4) there are only two peaks. In contrast, when the excitation sequence shown in FIG. 21 is used there are at least three peaks at any point in the cycle. This is preferable, as three or more peaks (i.e. extended segments) provide a stable support for the supported (moved) object or for the tube itself if the end surface 21 is resting on a base surface. With at least three peaks at any one time, the frequency of the control voltage cycle can be a slow as one likes without comprising tube, or supported object, stability.

Referring now to FIGS. 22a to 22d, these show the wave peak positions P at successive times T1, T2, T3 and T4 on the surface of a tube having 12-segment configuration and excited accordingly to the technique illustrated in FIG. 19.

In FIGS. 22a to 22d the arrows indicate the general directions of travel of the peaks P.

FIGS. 22e to 22h illustrate the rotation of a supported body 1 as a result of interaction with the travelling waves whose peak motions are depicted in FIGS. 22a to 22d. In FIGS. 22e to FIGS. 22h the supported body 1 has a spherical first surface 11 which is arranged to rest on the upper surface 21 of the tube. When the travelling waves are generated, the spherical surface 11 is supported only by the peaks P. The travelling waves are such that the tube material motion at the top of each peak is in a direction opposite to the direction of travel of the peak itself. Thus, as the peaks P progressively travel to the right in the figures, as time advances from T1 to T2 to T3 to T4, the supported body 1 is rotated in a direction indicated generally by arrow R. In this example the supported body 1 comprises a mirror 12. Thus, by generation of suitable opposing travelling waves on the tube surface, fine positioning control of the body 1 can be achieved, thus providing fine tilt control of the mirror for a range of applications.

Figure 23:
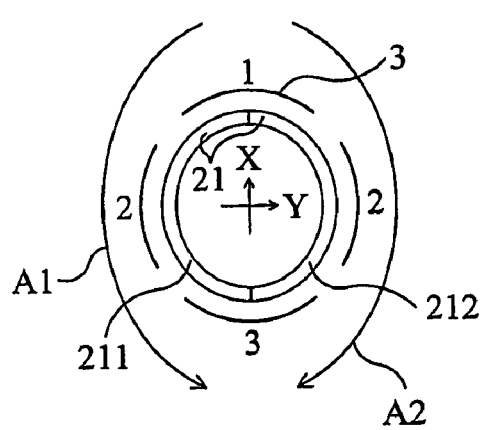
FIGS. 23 to 26 illustrates alternative electrode arrangements and excitation sequences which may be used in embodiments of the invention.
Figure 24:
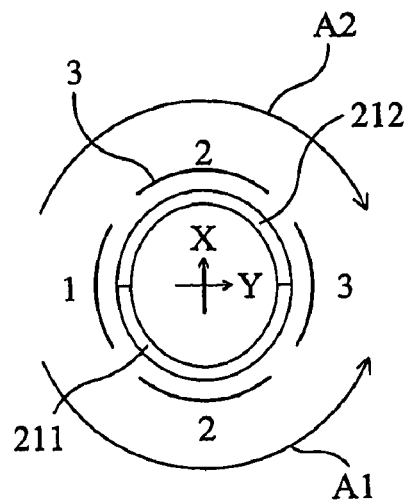

Referring now to FIGS. 23 and 24, these show the use of a four-segment configuration (i.e. four spaced apart electrodes) to generate first and second travelling waves on the surface of a piezoelectric tube. Again, the FIGS. 1, 2 and 3 next to the electrodes three indicate the sequence of excitation. As with FIG. 18, if a flat object surface were placed in contact with surface 21 shown in FIG. 23 then the sequence of electrodes excitations would translate the object in the positive X direction. Alternatively, an object having a spherical surface resting on the end surface 21 would be rotated about an axis parallel to the Y direction. The movement of a supported object result from the interaction generated in FIG. 24 would be the same as that described with reference to FIG. 19. A four electrode (or 4-segment) configuration is convenient as it uses the same segmentation that is used conventional fine X, Y and Z positioning with piezoelectric tubes. The configuration allows for perpendicular axes of movement.

Figure 25:
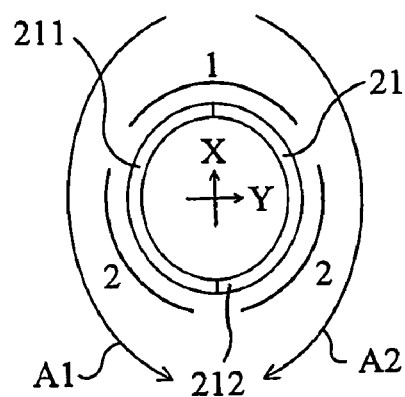
Figure 26:
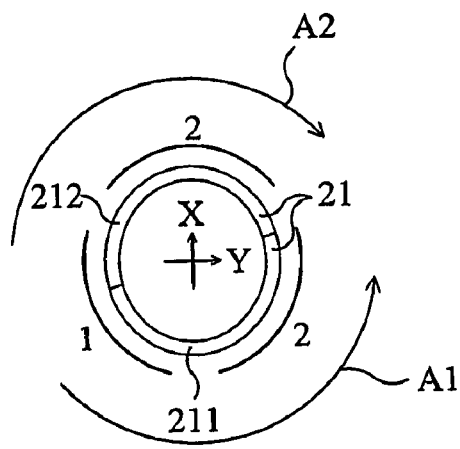

FIGS. 25 and 26 illustrate the use of a 3-segment configuration to generate first and second travelling waves on respective portions of the end surface of piezoelectric tube. 3-segment configuration provides the minimum number of segments to provide relative translation or motion between the tube and the surface with which it is in contact, or to provide relative rotation between the tube and a surface with which it is in contact about an axis other than the longitudinal axis of the tube.

In the embodiments of the invention utilizing tubular members and generating opposing travelling surface waves on an end surface of the tubular member, the surface arranged in contact with the end surface may have a variety of shapes. The surface may be a surface of an object moved by the tube (e.g. supported by the tube) or alternatively may be a surface (e.g. a base surface) over which the tube moves. Examples of suitable surfaces include: surfaces with zero curvature in both directions (flat planes); surfaces with zero curvature in one direction and constant, non-zero curvature in another direction (a cylinder); and surfaces with equal non-zero curvatures in two directions (a sphere).

Figure 27:
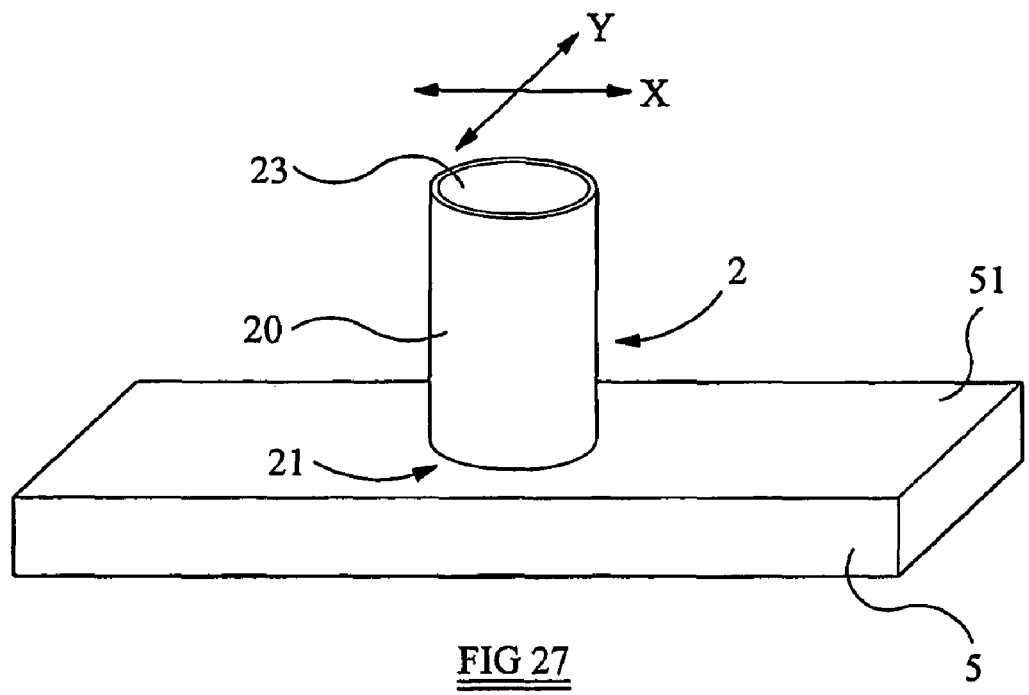
FIG. 27 illustrates positioning apparatus in accordance with an embodiment of the invention.

FIG. 27 illustrates an embodiment of the invention comprising a piezoelectric tube having a flat annular end surface 21 resting on the flat upper surface 51 of a base member 5. Thus, the base 5 supports the tube. Although not shown in the figure a plurality of electrodes are attached to the tube, their arrangement being such that travelling waves may be generated on the end surface 21 by application of a suitable control voltages to the electrodes, those travelling surface waves interacting with the supporting surface 51 to provide controllable translation of the tube 2 over the supporting surface 51. In other words by appropriate application of control voltages to the electrodes the tube can be translated in a first direction parallel to the plane of the supporting surface 51 (i.e. the X direction in the figure), and also it can be controlled to provide controllable movement in a second perpendicular direction parallel to the supporting surface (i.e. the Y direction in the figure). Thus, by generation of the opposing travelling waves on the end surface 21, caterpillar-type motion can be achieved. The tube is able to "walk" over the supporting surface 51 whilst remaining upright. In this example, the tube 2 is pressed against the flat supporting surface 51 by gravity alone. In alternative embodiments, biasing means may be arranged to urge the end surface 21 and the supporting surface 51 together. The tube may then be arranged to walk over a non-horizontal surface. Although the electrode arrangement is not shown in FIG. 27, it will be appreciated that a variety of electrode arrangements may be employed, utilising combinations of electrodes, positioned on the outer surface 20 and/or the inner surface 23 of the tube. By continuing to generate the first and second travelling waves on the end surface 21 of the tube, the tube continues to "walk" over the supporting surface 51. Thus, by appropriate control, large movements (translations) can be achieved in the X and Y directions. The arrangement of FIG. 27 can thus be utilised in positioning apparatus to achieve coarse motion in two directions.

Figure 28:
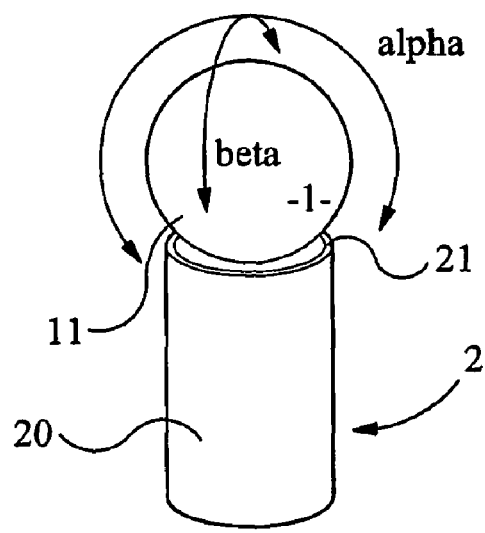
FIG. 28 illustrates another positioning apparatus in accordance with the present invention.

Referring now to FIG. 28, this shows an alternative embodiment of the invention in which a spherical object 1 is pressed against the end surface 21 of the tube. The object 1 is thus supported by the tube. Again, although not shown in the figure, a plurality of electrodes are arranged on the tube so as to permit generation of travelling surface waves on the upper surface 21 using techniques described above. For example, an array of 12 electrodes may be used to generate surface waves which interact with the sphere 1 to produce independent rotation control about two mutually perpendicular axis which are themselves perpendicular to the longitudinal axis of the tube. These independent rotations are labelled alpha and beta in the figure.

Figure 29:
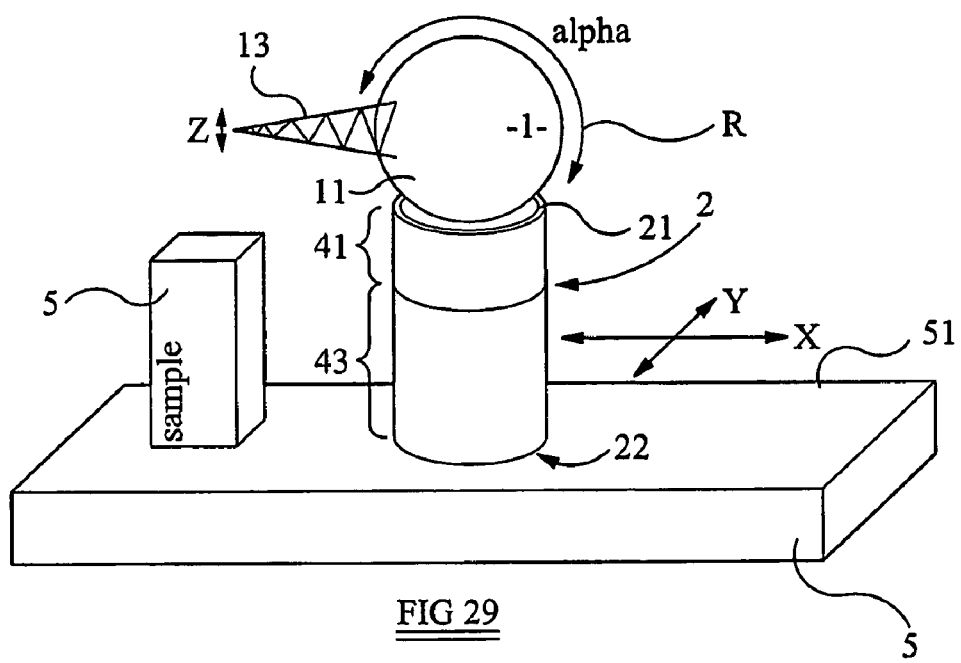
FIG. 29 illustrates positioning apparatus embodying the invention.

Referring now to FIG. 29, this illustrates manipulation apparatus embodying the invention. The apparatus comprises a base 5 and a sample S mounted on the base. A tube 2 of piezoelectric material is supported by the base 5, with a lower end surface 22 of the tube resting on the flat base surface 51. An upper end surface 21 of the tube supports a moveable body comprising a sphere 1 and a cantilever 13 fixed to and extending from the sphere. The sphere provides a spherical operational surface 11 which is in contact with the upper end surface 21 of the tube. A top longitudinal end portion 41 of the tube is provided with a first array of electrodes, the first array being arranged such that opposing travelling surface waves can be generated on the upper surface by application of suitable control voltages, as described above. A lower longitudinal end portion 43 of the tube is provided with a second array of electrodes, arranged such that opposing travelling surface waves can be generated on the lower end surface 22 by application of appropriate control voltages, also as described above. Thus, the top and bottom parts 41, 43 of the tube are segmented independently. A controller (not shown in the figure) provides control voltages to the electrodes on the top longitudinal segment 41 so as to generate travelling surface waves on surface 21 and provide controllable rotation of the sphere 1 in the direction indicated generally by arrow R. This corresponds to rotation of the sphere about an axis parallel to the Y axis in the figure. As the sphere is rotated in this way, the tip of the cantilever is moved, that movement including motion in the Z direction. Thus, the cantilever fixed to the to the sphere converts the angular motion of the supported sphere into coarse Z motion of the cantilever tip. The controller is also arranged to generate travelling surface waves on the lower end surface 22 to provide controlled translational movement of the tube 2 over the supporting base surface 51 in the X and Y directions. Thus, control of the electrodes on the lower longitudinal segment 43 is able to provide coarse motion of the cantilever tip in the X and Y directions, and control of the electrodes of the upper longitudinal end portion 41 is able to provide coarse Z motion control of the cantilever tip by rotating the sphere. Advantageously, the controller may be further arranged to apply suitable control voltages to the electrodes of both the top and bottom longitudinal portions 41, 43 to provide controllable bending of the tube 2 and controlled elongation or shrinkage of the tube along the Z axis, so as to provide fine X, Y & Z movement of the upper surface 21 and hence of the cantilever tip connected to the supported sphere. In this way, the apparatus is able to provide both a fine and coarse positioning of the tip in all three directions X. Y and Z relative to the sample S. This fine and coarse positioning control in all three directions has been conveniently achieved with only a small number of components. The simplicity, small size, and small mass of the apparatus provides significant advantages over the prior art positioning techniques.

Figure 30:
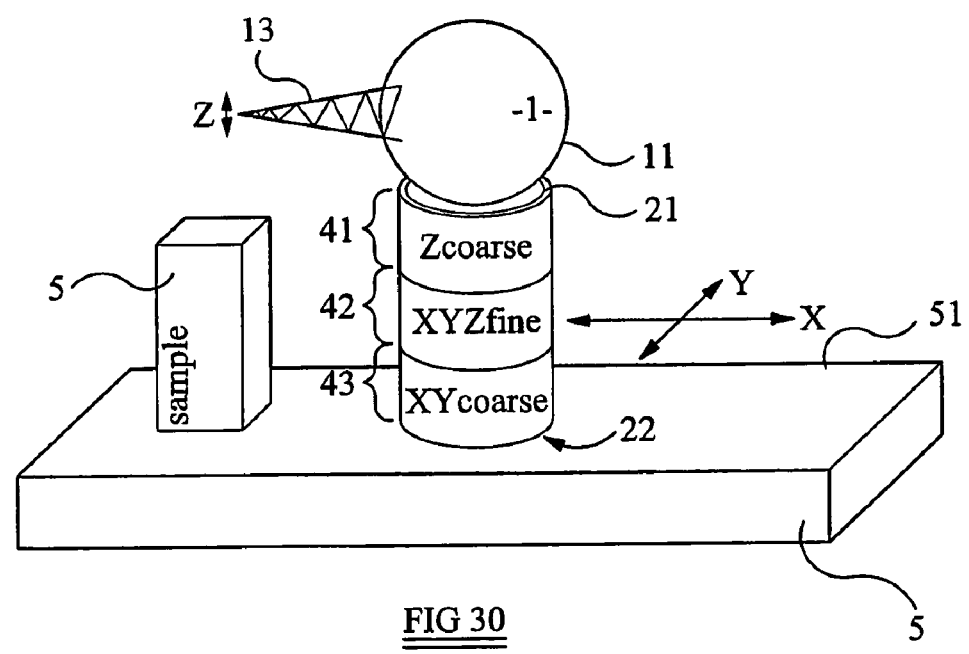
FIG. 30 illustrates alternative positioning apparatus embodying the invention.

Referring now to FIG. 30, this illustrates a modification to the apparatus shown in FIG. 29. Again, a piezoelectric tube is supported by a base 5 and itself supports a sphere carrying a cantilever 13 (which may also be described as a probe). In FIG. 30, however, fine motion control in the X, Y and Z directions is achieved by means of application of suitable control voltages to a plurality of electrodes attached to a central longitudinal portion 42 of the tube. A separate set of electrodes is arranged on the upper end segment 41 to generate the travelling waves necessary to provide controlled rotation of the supported sphere, and another plurality of the electrodes is arranged on the lower end segment 43 to generate the travelling waves required to provide translation of the tube over the supporting surface 51. An example of a piezoelectric tube and electrode arrangement suitable for use in the apparatus depicted in FIG. 30 is shown in FIG. 31.

Figures 31, 32, 33:
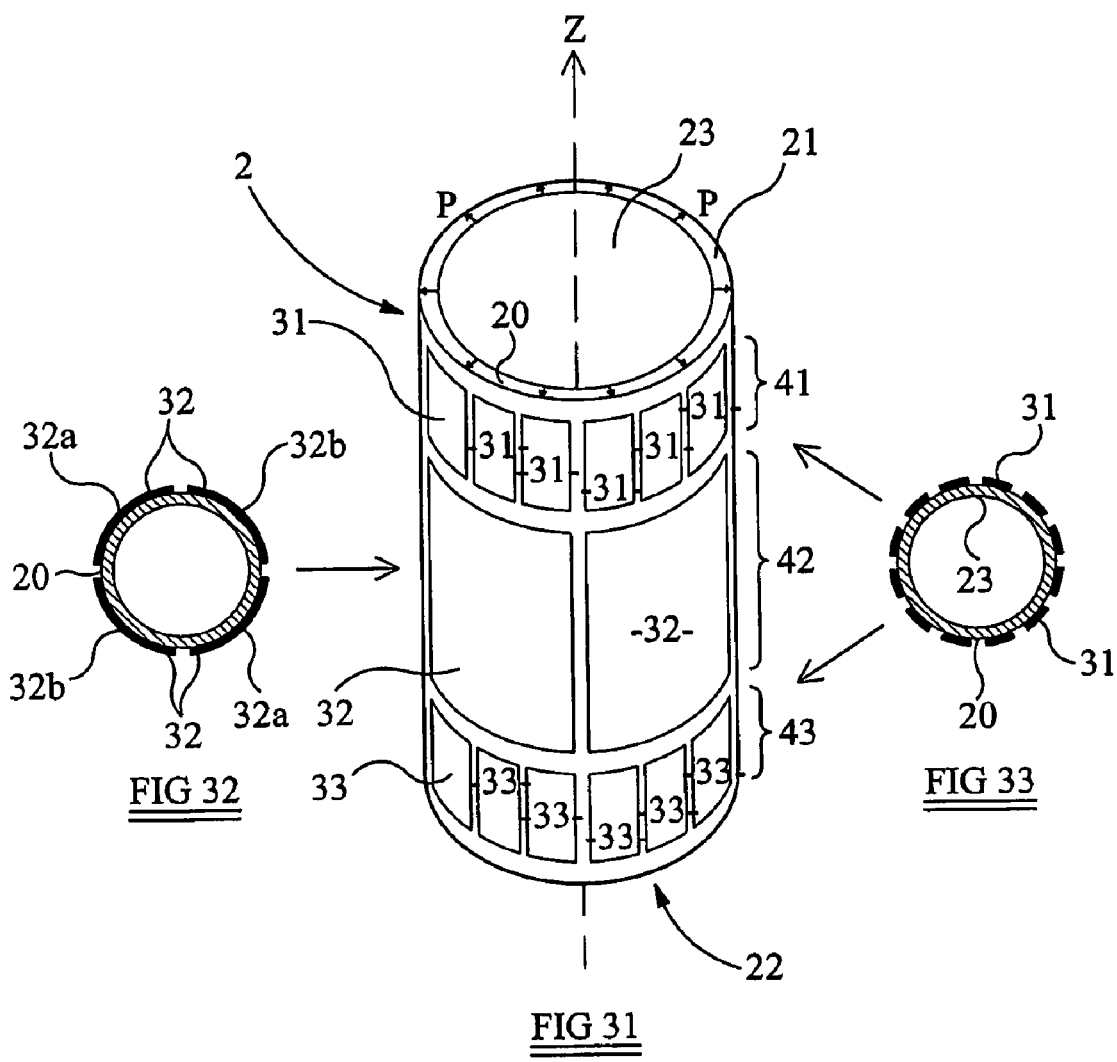
FIG. 31 illustrates a piezoelectric tube and electrode arrangement suitable for use in embodiments of the invention.
FIG. 32 is a schematic cross section of a central section of the tube and electrode arrangement of FIG. 31.
FIG. 33 is a schematic cross section of the end portions of the tube and electrode arrangement of FIG. 31.

Referring now to FIG. 31, this shows a tubular member suitable for use in embodiments of the invention. The tubular member comprises a cylindrical tube of piezoelectric material, the tube having a circular cross section. The material of the tube is poled in the radial direction, as indicated by the short arrows P on the upper end surface 21. In this example the upper end surface 21 is annular and flat. The tube has a second annular, flat end surface 22 at its opposite end. The top longitudinal section 41 of the tube is provided with an array of twelve electrodes 31 evenly spaced around the circumference (i.e. perimeter) of the tube on its outer surface 20. A schematic cross section of this top end portion 41 of the tube and the twelve-electrode arrangement is shown in FIG. 33. As will be seen, the electrodes divide the top portion of the tube into 12 segments, and they be excited by control voltages using techniques as described above in order to generate travelling surface waves on the upper end surface 21. It will be appreciated that, to suit requirements, the 12 electrodes in the upper end portion may be excited in a variety of ways, for example, to provide two or more travelling surface waves on the end surface. The travelling surface waves need not necessarily travel around a full half of the end surface. For example, diametrically opposed groups of three electrodes may be exited to generate first and second travelling ways, each of which travels around just one quarter of the end surface.

A bottom end segment 43 of the tube is provided with a similar arrangement of twelve electrodes 33 which can be excited to generate travelling waves on the bottom end surface 22 using the same techniques as those used to produce the waves on the upper surface 21. Thus, the upper set of electrodes 31 can be used to generate travelling waves on the upper surface 21 to translate and/or rotate a supported body whilst the lower set of electrodes 33 can be used to generate travelling waves on the lower surface 22 to provide separate, i.e. independent control of translational movement of the tube over a surface on which it is supported. It will also be appreciated that the lower set of electrodes can be controlled in another way to produce rotation of the tube about the Z axis. To achieve this, rather than generating opposing travelling waves along respective portions of the lower surface, the electrodes could be used to generate one or more travelling waves on the lower surface which travel in the same direction around it.

The central longitudinal segment 42 of the tube of FIG. 31 is provided with an array of four larger electrodes 32. A common voltage may be applied to all four of these electrodes 32 to control elongation or shrinkage of the tube in the Z direction (i.e. to provide fine Z control of the position of the upper surface 21). A differential voltage may be applied between a first diametrically opposed pair of these electrodes 32*a* to provide controllable bending of the tube in one direction and thus provide fine movement control of the end surface 21 in, say, the nominal X direction. A differential voltage may be applied between the second opposing pair 32*b* of central portion electrodes to achieve bending in an orthogonal direction, to provide fine control of the Y position of the end surface 21 for example. Thus, with the electrode arrangement shown in FIGS. 31 to 33, three different groups of electrodes are employed to provide independent control of movement of a body supported on the top surface 21, movement of the tube itself over a supporting surface, and bending and elongation of the tube itself If the tube is used to support a body carrying a probe, for example, then fine X, Y and Z motion of a probe tip can be achieved independently from coarse X, Y and Z motion.

Figure 34:
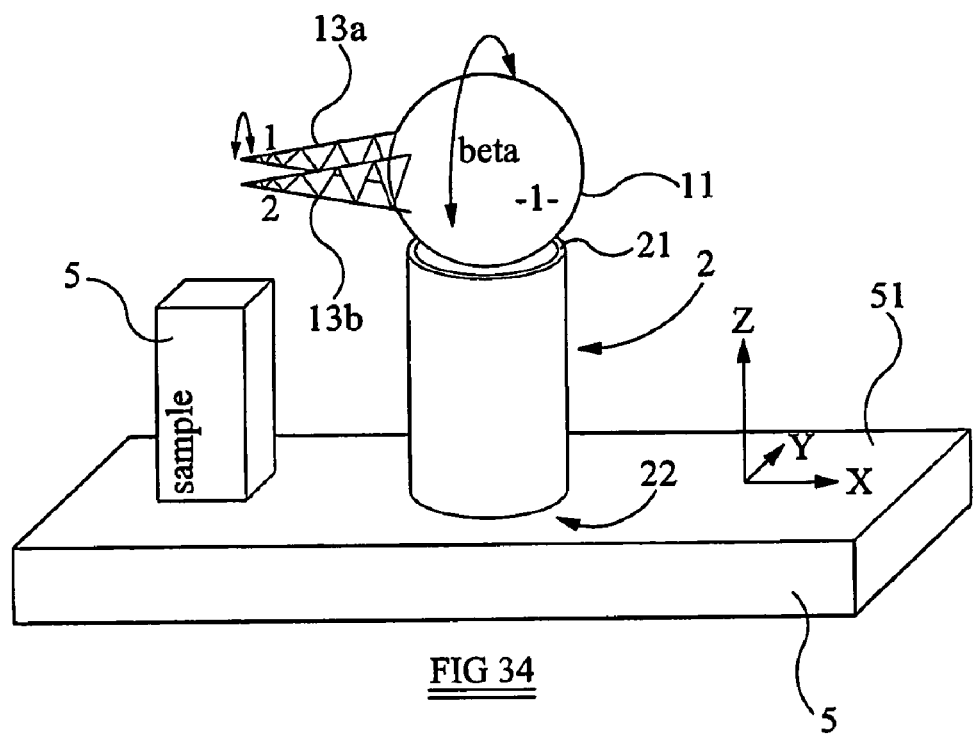
FIG. 34 is a schematic representation of positioning apparatus embodying the invention.

FIG. 34 shows positioning apparatus in accordance with an alternative embodiment of the invention. For simplicity, the electrode arrangement on the tube 2 is not shown. However, it will be appreciated that an electrode arrangement such as that shown in FIG. 31 may be employed. In the present embodiment, the moveable member 1 supported by the tube 2 comprises two cantilevers 13*a* and 13*b*. They are fixed to the spherical portion of the body 1. The moveable member may be rotated by suitable generation of travelling waves on the upper surface 21 to bring one or the other of the cantilevers close to the sample S. This arrangement gives the possibility to choose between two different cantilevers or to change a broken or contaminated cantilever quickly. For example, in certain embodiments of the invention one cantilever can hold an atomic force microscopy tip, while the other can hold a scanning tunnelling microscopy tip. It will be appreciated that these are merely examples, and indeed the moveable members supported on the tube may comprise one, two or even more cantilevers, probes, tips or the like. For example, in another embodiment the moveable member (such as a lens) can hold a carousel of, say, ten probes.

Figure 35:
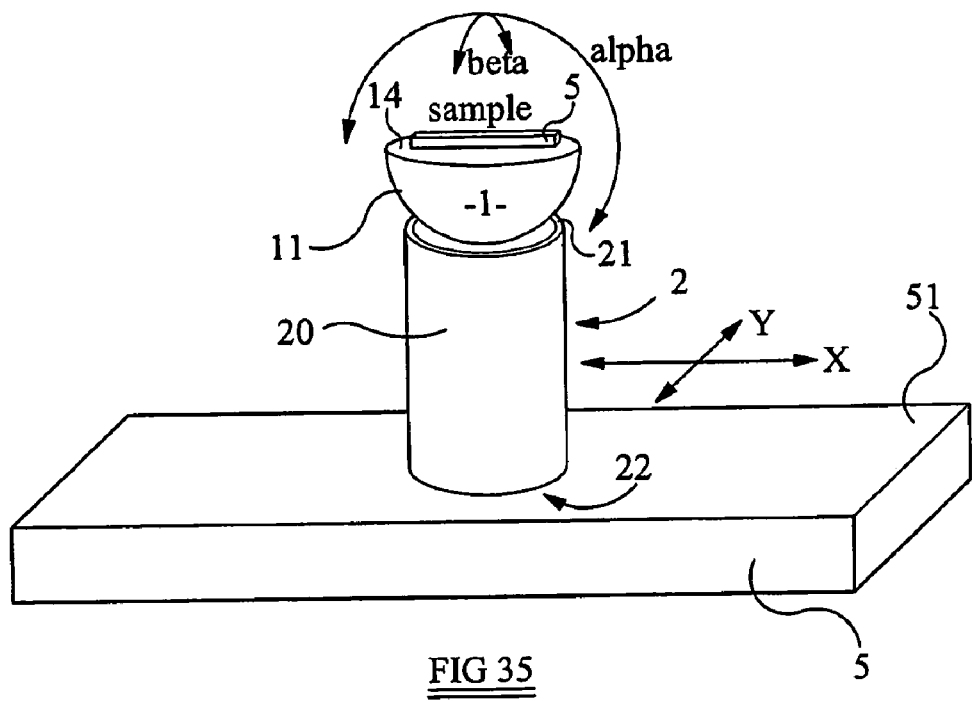
FIG. 35 is a schematic representation of a sample positioning apparatus embodying the invention.

FIG. 35 shows alternative positioning apparatus embodying the invention. Here the piezoelectric tube 2 supports a body having a hemispherical surface 11 in contact with the upper surface 21 of the tube, and an upper flat surface 14 arranged to support a sample S. In other words, the supported body 1 is a rotatable sample stage. Again, the tube may be provided with an electrode arrangement in accordance with the techniques described above. By suitable arrangement of the electrodes, travelling waves may be generated on the upper surface 21 to control tilt of the sample in the orthogonal directions denoted by arrows alpha and beta in the figure. The electrode arrangement is such that travelling waves can be generated on the lower end surface 22 of the tube to provide translation of the tube relative to the base 5 and hence provide coarse X and Y positioning of the supported sample. The electrode arrangement also provides for fine control of the X, Y and Z position of the sample by providing controllable elongation of the tube and controllable bending.

FIG. 36 shows an alternative electrode arrangement for producing travelling surface waves 211 and 212 on the end surface 21 of a tube of piezoelectric material in embodiments of the invention. Here, rather than the electrodes 31 being spaced evenly around the entire circumference of the tube, they are confined to azimuthal segments 201*a* and 201*b*. The electrodes are also confined to an end longitudinal segment 41 of the tube, i.e. they are arranged close to the surface 21 on which they are used to generate travelling surface waves. The electrodes comprise a first group of six electrodes 31*b* which extend around the first azimuthal segment 201*b*. Thus they are arranged adjacent the first portion 211 of the end surface 21. This first array of electrodes 31*b* is arranged on the outer surface 20 of the tube. A corresponding common electrode 311*b* is arranged on the inner surface 23 of the tube, again extending around the first azimuthal segment 201*b*. A second group of outer surface electrodes 31*a* and a corresponding inner surface electrode 311*a* are arranged on the longitudinal end section 41 of the tube at a position diametrically opposed to that of the first group. FIG. 37 is a schematic end view, looking along the longitudinal axis, of the tube and electrode arrangement from FIG. 36, and the numbers 1, 2, and 3 next to the outer surface electrodes generally represent an excitation sequence. In other words, the numbers 1, 2 and 3 denote the positions of the peaks of travelling surface waves generated on the first and second portions 211 and 212 of the upper surface 21 at successive times in the wave generation cycle. In this example, the first azimuthal segment 201*b* has an angular extent B which is the same as the angular extent A of the second azimuthal segment 201*a*. However, in alternative embodiment, these angles A and B are not necessarily the same. The rows of electrodes shown in FIGS. 36 and 37 can thus be controlled by a three phase supply to generate a first travelling wave which travels in the clockwise direction along portion 211 of the upper surface, and at the same time to generate a second travelling wave which travels in the counter clockwise direction along portion 212. By using six outer electrodes on each azimuthal segment as illustrated in the figures, these travelling waves may each comprise two peaks P at any one time. FIGS. 38*a* to 38*c* are highly schematic illustration of the motion of these peaks at three successive times in the wave generation cycle.

It will be appreciated that the heights of the peaks P shown in FIGS. 38*a* to 38*c* are greatly exaggerated. This is merely to assist understanding of the principle of operation.

Thus, in the arrangements shown in FIGS. 36 to 38, the first and second travelling surface waves do not travel around the entire end surface, but instead only travel around relatively short, diametrically opposed sections of that surface. This technique is able to provide translation of a flat surface supported by the tube, or rotation of a supported object about an axis other than the longitudinal axis of the tube. However, it provides the additional advantage that it reduces wear between the supporting surface 21 and the supported surface because the components of the first and second travelling waves which try to push a supported surface in opposite directions are only small. This is in contrast to embodiments in which first and second travelling waves are generated around respective halves of the end surface, in which, at the points where the halves meet, the travelling waves are trying to push a supported surface in completely opposite directions.

Referring now to FIGS. 39 to 42, these illustrate an alternative embodiment of the invention in which a sheet 2 of piezoelectric material is used rather than a piezoelectric tube. The sheet 2 has one end coupled to a supporting surface 51, and supports a movable cylindrical member 1 on an upper end surface 21. The upper end surface 21 is cylindrical so as to conform with the cylindrical outer surface 11 of the supported body 1. A plurality of electrodes 31 is arranged on an upper end portion 41 of the sheet, close to the upper end surface 21. Control voltages are applied to these electrodes 31 to generate travelling surface waves on the upper end surface 21 and rotate the body 1 about rotational axis RA. Larger electrodes 32 are arranged on opposite sides of the sheet 2, closer to the support surface 51, and control voltages may be applied between these electrodes 32 to achieve bending of the sheet to move the supported surface 21 (and hence the supported cylinder) along the rotational axis RA and to provide controlled elongation and shrinkage of the sheet 2 in the vertical direction of the figure, that is in a direction perpendicular to the rotational axis RA. Thus, the lower electrodes 32 can be used to provide fine positioning of the supported cylinder in two mutually perpendicular directions, and control of the upper set of electrodes 31 can be used to control rotation of the cylinder. The material of the sheet is poled in a direction P which is normal to the front and rear faces 28, 29.

FIGS. 43a to 43c illustrate the sequential excitation of the upper set of electrodes 31 to produce a travelling wave on the surface 21 which has two peaks P. These travelling waves are Rayleigh surface waves. The direction of propagation of the waves is denoted by the arrow on the front face 28 of the body, and interaction between the material at the wave peaks P and the cylinder is such that the cylinder is rotated in the direction shown by arrow R.

FIGS. 44 and 45 show a tubular piece of electric member and electrode arrangement suitable for use in alternative embodiments of the invention. The cross section of the tube in this example is generally square and the upper end surface 21 is adapted to provide a seat for a cylindrical surface. Each outer face of the tube is provided with a respective line of electrodes 31 positioned close to the top edge, (i.e. adjacent to the upper surface 21). By appropriate application of control voltages to electrodes 31a and 31b on opposite sides of the tube, travelling waves can be generated on the corresponding portions of the upper surface 21 to rotate the supported cylindrical surface about its longitudinal axis. Independent control of movement of the supported cylindrical surface in a direction parallel to its longitudinal axis can be achieved by application of suitable control voltages to the sets of electrodes 31c and 31d on the other pair of sides of the tube.

Figure 46:
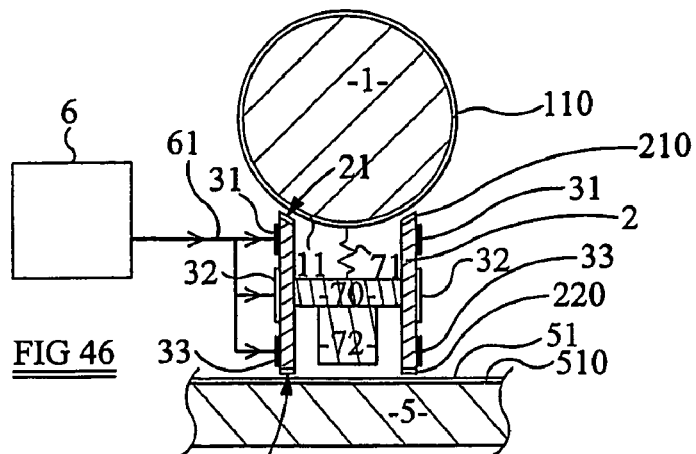
FIG. 46 is a highly schematic cross section of positioning apparatus in accordance with an embodiment of the invention.

Referring now to FIG. 46, this illustrates alternative positioning apparatus embodying the invention. Here a spherical body 1 is supported by a cylindrical piece of electric tube 2 which is itself supported by a base 5. The upper end surface of the tube is provided with a coating or layer of wear-resistant material 210. It is a surface of this material 21 against which the spherical body sits. The spherical body is also provided with an outer coating or layer of wear-resistant material 110, and the operational surface 11 of the spherical body 1 is hence a surface of this coating or layer 110. The upper seating surface 21 is shaped so as to conform with the portion of the spherical surface 11 with which it engages. An anchor member 70 is rigidly fixed inside the tube 2 and the spring 71 is connected between this anchor member 70 and the supported body 1 so as to bias the operational surface 11 against the supporting surface 21. In other words, the sphere is pulled down onto the tube. A lower end surface of the tube comprises another coating or layer of wear-resistant material 220 which rests on a wear-resistant coating 501 which provides the upper supporting surface 51 of a base 5. A magnet 72 is attached to the anchor member 70 and the base 5 comprises ferrous material such that the attraction between the magnet and base hold the tube and base together. Thus, the positioning apparatus need not be used in the horizontal configuration. The piezoelectric tube is provided with an electrode arrangement of the type described with reference to FIG. 31, and a control system 6 provides suitable control voltages 61 to the electrodes of the upper, middle and lower longitudinal sections of the tube so as to the provide controlled rotation of the supported body and translation of the tube over the base 5.

Figure 47:
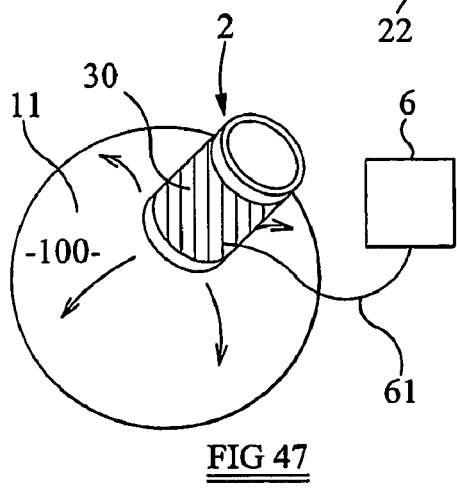
FIG. 47 is a highly schematic representation of alternative positioning apparatus embodying the invention.

Moving onto FIG. 47, this is a highly schematic illustration of another embodiment of the invention in which a piezoelectric tube is arranged to "walk" over the spherical surface 11 of a body 100. This relative movement is achieved by appropriate application of control voltages to an electrode arrangement on the piezoelectric tube. The control voltages 61 are provided by controller 6, and the electrode arrangement is generally indicated by reference numeral 30. The arrangement is such that travelling waves are generated on the surface of the tube in contact with the body 100 using techniques described above.

Figure 48:
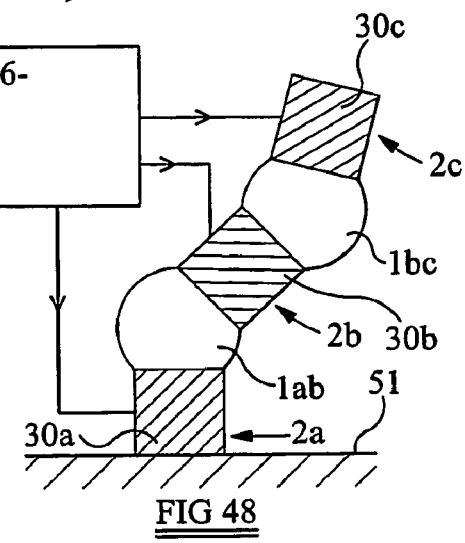
FIG. 48 is a highly schematic representation of yet another positioning apparatus embodying the invention.

FIG. 48 is a highly schematic representation of an articulated manipulation apparatus embodying the invention. This apparatus comprises a first piezoelectric tube 2a supported on a support surface 51. A first sphere 1ab is supported on first tube 2a, and it self supports a second piezoelectric tube 2b. A second sphere 1bc is supported on the second tube 2b, and itself supports a third tube 2c. Each of the tubes is provided with a respective electrode arrangement 30a, 30b, 30c, the arrangements being such that application of suitable control voltages from a controller 6 are able to generate travelling surface waves independently at each end of each tube.

Figure 49:
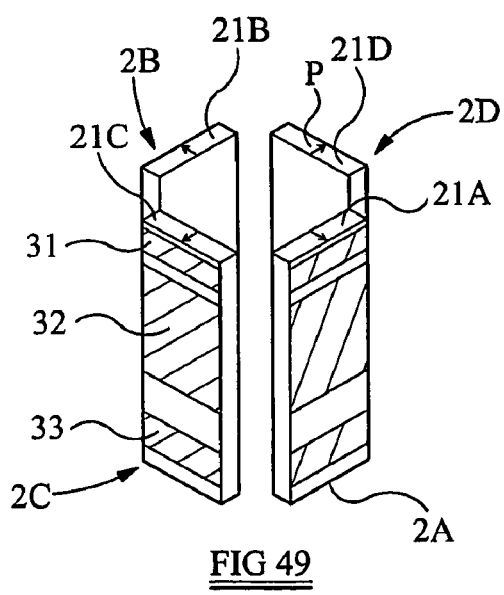
FIG. 49 is a schematic arrangement of piezoelectric support members suitable for use in embodiments of the invention.

FIG. 49 illustrates an alternative arrangement of piezoelectric members suitable for use in embodiments of the invention. This arrangement comprises four slabs of piezoelectric material 2a, 2b, 2c and 2d. The upper surfaces 21 of the members provide support for a moveable member. Each slab is provided with a lower electrode arrangement 33 for generating travelling surface waves along a lower end surface. Each slab is provided with a central electrode arrangement 32 for providing controlled bending of the slab and controlled elongation and shrinkage in the vertical direction in the figure. Each slab is also provided with an upper electrode arrangement 31 which can be controlled to generate travelling surface waves along the upper surfaces. For example, a flat body can be supported on the upper surfaces and travelling waves can be generated on the upper surfaces 21a and 21b to translate the object in one direction, and then travelling waves can be generated on surfaces 21c and 21d to move the supported object in a perpendicular direction.

Figure 50:
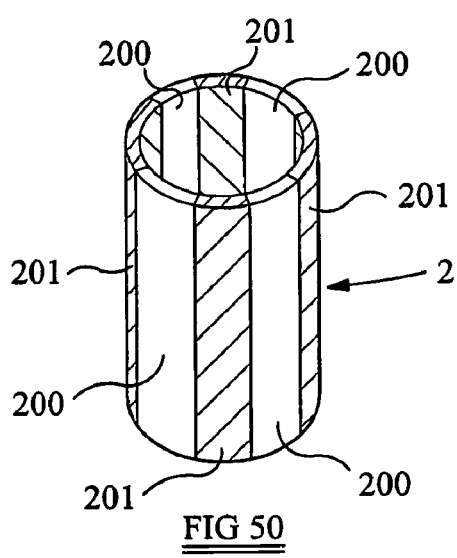
FIG. 50 is a schematic representation of a tubular body suitable for use in embodiments of the invention.

FIG. 50 illustrates an alternative tubular member for use in embodiments of the invention. This tube has a composite structure in that it comprises segments 201 of piezoelectric material and segments 200 of non-piezoelectric material. In use, just the piezoelectric segments may be provided with electrode arrangements as described above to generate travelling surface waves on portions of the upper surface corresponding to those piezoelectric segments.

Figure 51:
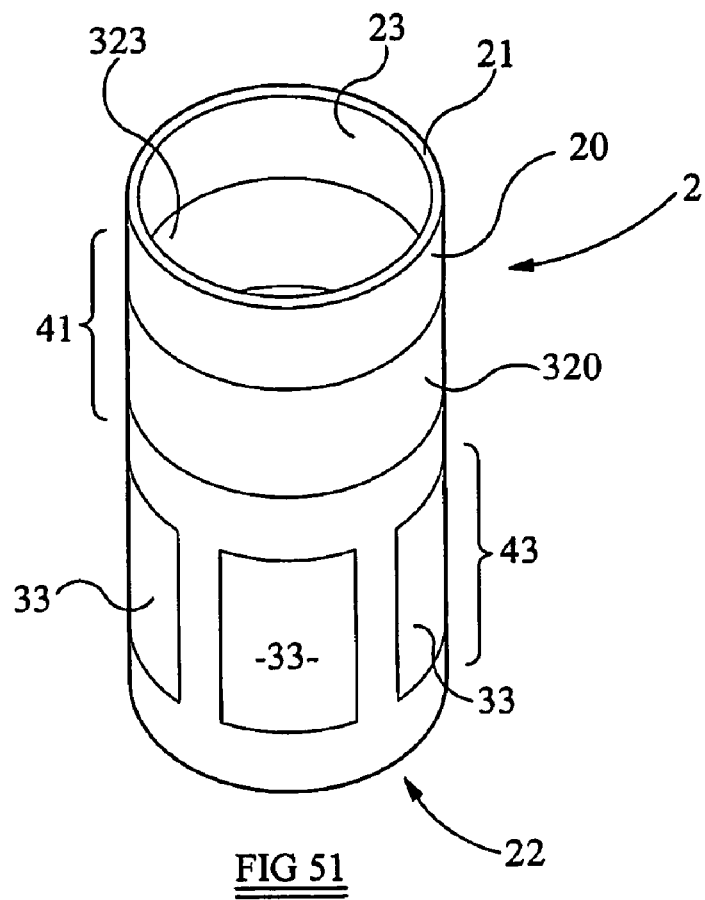
FIG. 51 illustrates another piezoelectric tube and electrode arrangement suitable for use in embodiments of the invention.

FIG. 51 illustrates a piezoelectric tube 2 and electrode arrangement for use in embodiments of the invention. An upper portion 41 of the tube is provided with an outer ring electrode 320 on its outer surface 20, and an inner ring electrode 323 on its inner surface 23. These ring electrodes 320, 323 are thus concentric, and are used to provide fine control of elongation of the tube. In other words, appropriate voltages may be applied between the inner and outer circular electrodes 320,323 to adjust the longitudinal position of the upper end surface 21 with respect to the lower end surface 22. A lower segment 43 of the tube is segmented by a plurality of electrodes 33 (four of them, in this example). These lower electrodes are controlled to provide controlled bending of the tube and to generate travelling waves on the lower end surface 22. A variety of suitable electrode arrangements for the inner surface of the lower segment will be apparent from the preceding description.

Figure 52:
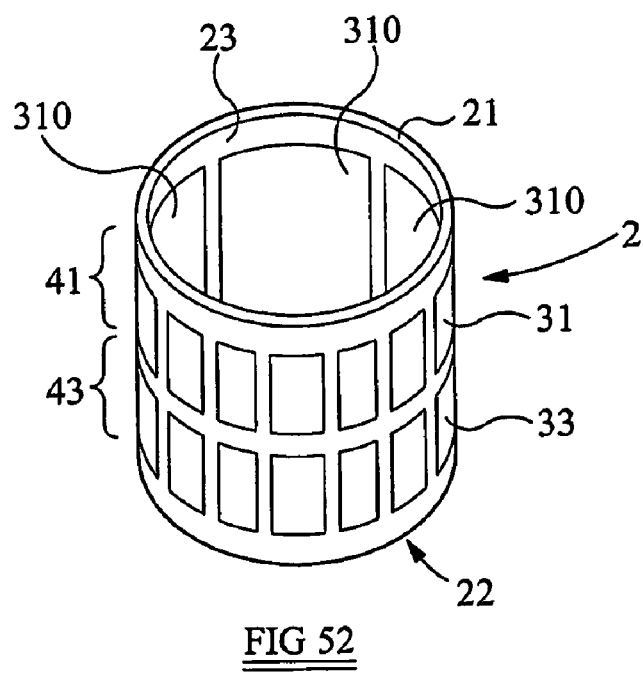
FIG. 52 illustrates yet another piezoelectric tube and electrode arrangement suitable for use in embodiments of the invention.

FIG. 52 illustrates an alternative tube and electrode arrangement. Here, the inner surface 23 is segmented by four inner electrodes 310, each of which extends along both upper and lower portions 41, 43 of the tube. On the outer surface, an upper portion 41 is segmented by one group of electrodes 31, and the lower portion 43 is segmented in the same way by a second group 33. Control voltages may be applied to the electrodes in a variety of ways, as will be appreciated from the preceding description. For example, to generate travelling waves on the upper end surface 21, the inner electrodes 310 may be held at a common potential, whilst the electrodes 31 of the upper group are excited in an appropriate sequence. Similarly, travelling waves on the lower surface may be generated by excitation of the lower group of electrodes 33, with the inner electrodes held constant. To achieve elongation, a common potential may be applied between the inner and outer electrodes. To control bending, differential voltages may be applied between opposing pairs of the inner electrodes 310, and/or opposing pairs or opposing groups of the outer electrodes 31,33. The different modes of deformation and wave generation may, of course, be combined simultaneously, by appropriate application of control voltages. The voltage applied to a particular electrode at a particular time may thus comprise a number of different components.

From the above it will be appreciated that in certain embodiments of the invention a piezoelectric tube is used for 6 degrees of freedom: coarse positioning X, Y, Z and fine positioning X, Y, Z. Realisation of all 6 degrees of freedom in one device makes it smaller, lighter, more reliable, less susceptible to external vibration, and cheaper than prior art apparatus. Further advantages will be apparent. In certain embodiments, coarse X and Y movements are achieved by means of at least 3 independently driven sectors located close to one edge of the tube. Sequential application of electric driving voltage to these sectors results in a caterpillar-like motion of the edge. The tube may be placed on a fixed flat surface and pressed against it by gravity, by a spring, by magnetic force or by vacuum suction, can walk on it in the direction determined by the caterpillar motion. Coarse Z movement can be achieved by means of at least 3 independently driven sectors located close to another edge of the tube. Sequential application of electric driving voltage to these sectors results in a caterpillar-like motion of the edge. A sphere or object having partially spherical shape (e.g., a lens) placed on the edge of the tube and pressed against it by gravity, a spring, magnetic force or vacuum suction can rotate in the direction determined by the caterpillar motion. A cantilever (beam, wing, whisker) attached to the sphere converts the rotation into Z coarse motion of its end. Fine X, Y and Z control may be achieved by means of a middle part of the tube segmented by any of the ways used conventionally for piezoelectric tube fine movement (3 or more independently driven sectors). Alternatively fine positioning can be achieved by the same sectors used for coarse X and Y or those used for coarse Z motion.

Thus, aspects of the invention include using a piezoelectric tube to move objects laterally, the object having surface of a constant curvature in one direction and a constant curvature in another direction. These include lateral movement of a flat surface and a polar rotation of a sphere. A hemisphere or a lens put on the tube can serve to tilt a sample. This is particularly useful for positioning of a sample in a Scanning Electron Microscope.

Aspects also provide manipulation/positioning devices capable of rotation and linear translation of at least one supported body (of partially flat, cylindrical or spherical shape), or of moving against such a body. The active part of certain devices embodying the invention is a tube made of a piezoelectric material, and two deformation waves are excited in the cylinder by means of electrodes on its inner and outer sides. The waves deform an edge of the tube in a caterpillar way. The body translated or being translated against is engaged against the cylinder edge by friction.

Certain embodiments of the invention may be described as micro-manipulators, nano-manipulators, positioning devices, and actuators. Embodiments find a wide variety of applications, for example in Scanning Tunnelling Microscopes, Atomic Force Microscopes, and nanomanipulator systems.

Referring now to FIG. 53, that figure is a schematic representation of another tubular piezoelectric body 2 suitable for use in embodiments of the invention. The body 2 has a first end surface 21 which, rather than being substantially flat, is provided with a plurality of slots or grooves. Thus, the end surface 21 can be regarded as generally castellated. In this example, the number of grooves around the tube's circumference (12) is equal to the number of electrodes around the circumference. However, it will be appreciated that in alternative embodiments there may be a different number of grooves. For example, the number of grooves may be a non-unity multiple of the number of electrodes. Also, the grooves in alternative embodiments may have different shapes. The patterned end surface enables debris and contaminants to be trapped in the grooves, such that the lands between adjacent grooves may be kept clean. A movable member may thus be supported on the lands of the upper surface 21, and moved relative to the tubular body by means of travelling surface waves generated on the lands by application of suitable control voltages to the electrodes 31 of the upper portion 41 of the tube. In this example, the lower end surface 22 of the tube is similarly patterned, and travelling surface waves may be generated on the lower surface by application of control voltages to the electrodes 33 of the lower portion 43.

Referring now to FIGS. 54 and 55, these illustrate another embodiment of the invention in which a different method of performing relatively coarse movement in a nominal vertical direction (which may be described as Z coarse movement) is employed. The probe-positioning apparatus includes a piezoelectric body 2 which is generally tubular, and at least one of the tube ends has a pair of opposite slits 222. A movable member 1 in the form of a flat plate carries a probe 13 and is received in the pair of slits (slots) 222. Surfaces of the plate 1 are engaged against operational surfaces 223 of the body 2 (these operational surfaces are side surfaces of the slots, i.e. they are provided by the slit walls) by springs in this example. Those springs 71 each engage a non-operational surface 224 of a respective slit 222 and urge the plate 1 against the operational surface 223 on the opposite side of the slit. Although springs are illustrated, it will be appreciated that other biasing means, for example using magnetic force, may be used in alternative embodiments. To generate travelling waves on the operational surfaces to move the plate 1 in the vertical direction, electrodes are arranged along both slits. These comprise a plurality of external electrodes 31 on the outer surface 20 of the tube, adjacent the operational side surfaces of each slit, and a corresponding plurality of electrodes 310 arranged on the inner surface of the tube, again adjacent the operational side surfaces of the slits. By applying sequential voltages to the electrodes and generating two waves (one on each operational surface 223) travelling in the same direction (i.e. both travelling up, or both travelling down) the plate is moved in the longitudinal direction (vertical in this example). Although not shown in the figure, the lower end surface 22 of the body 2 may be supported on a base, and thus control of voltages applied to the electrodes adjacent the operational surfaces may be used to generate travelling surface waves of the Rayleigh-type to provide controlled movement of the plate 1, and probe 13, towards or away from the base. It will be appreciated that the body 2 may also be provided with a plurality of electrodes adjacent the lower surface 22 to enable generation of travelling surface waves on the lower surface to translate or rotate the body with respect to the base. Further electrodes may be provided on the body, as described above, to provide controlled distortion and hence fine positional control of the supported plate 1 in the X, Y and Z directions. It will be appreciated that the configuration depicted in FIGS. 54 and 55, with springs 71 arranged at opposite sides of the plate, benefits from the symmetry with respect to the tube central axis. This symmetry is crucial for stability (e.g. thermal drift) on a nanometer scale. However, configurations with springs or a spring arranged on only one side would also work. It will also be appreciated that differently shaped plates and slits (i.e. other than flat) can be used in embodiments of the invention. For example, cylindrical plates and slits would prohibit the rotational degree of freedom of the plate, therefore ensuring the same velocity of the plate along both slits. Other guiding and/or restricting shapes are also possible. FIGS. 56 and 57 illustrate an embodiment in which the movable member 1 is a curved plate (i.e. it can be regarded as a section of a cylinder)

In another embodiment, depicted in FIGS. 58 and 59, use is made of the possibility to apply waves directed in opposite directions. This results in the rotation of the plate 1, which in this example carries a plurality of probes 13*a*, 13*b*, and 13*c*. Thus, by appropriate application of voltages to the inner and/or outer electrodes 31, 310 adjacent the slot operational surfaces 224, an upwardly travelling wave can be generated on one side of the body 2 and a downwardly travelling wave on the opposite side. Interaction between these waves and the plate 1 can thus rotate the plate (about a horizontal axis in the figure, as depicted by the double-headed arrow). This rotation can be used to provide coarse positioning of a probe and/or to enable the changing of probes (for example to exchange a Scanning Tunnelling Microscope probe for a spare one or for Atomic Force Microscope probe).

Other than tube shaped piezoelectric bodies can be used in embodiments of the invention. Apparatus incorporating a kettle-shaped piezoelectric body 2 is shown in FIGS. 60 and 61. Electrodes 31 are arranged on an "upper" domed end of the body, alongside the operational surface 223 of a slot 222 in the end. A movable member 1 carrying probes 13*a-c* is received inside the slot 222 and a spring 71 inside the hollow body urges the member 1 against the operational surface 223. The member 1 can be made to perform rotation or translation depending on the direction of the travelling wave or waves generated by application of voltages to the electrodes 31.

It should be appreciated that in certain embodiments the width of the slit can be slightly (5-50 micron) less than the width of the plate. Then the plate can be held without requiring springs. In this case it is not easy to adjust the friction force. However, in contrast to slip-stick techniques, the travelling wave principle used in embodiments of the invention does not depend so strongly on the friction. One of the shapes of piezoelectric body better accommodating stress in this case is depicted in FIGS. 62-64. Here, the movable member 1 forms an interference fit in the slots 222, and is thus tightly held. Both sides of each slit thus provide operational surfaces, on which travelling waves are generated by a generation system including external electrodes 31 on either side of each slit. As with previous embodiments, the lower surface 22 of the body 2 can be supported on a base (over which it may be controlled to "walk"), and interaction between the travelling waves on the four operational surfaces 223 and the movable member 1 can be used to provide coarse positional control of the probe 13 towards and away from the base. Also, a distortion control system may be employed (including further electrodes and control voltage application means) to provide controlled distortion (e.g. elongation and/or bending) of the body, and hence fine positional control of the probe (which can also be referred to as a tool, tip, cantilever etc). FIG. 65 depicts a similar embodiment to that shown in FIGS. 62-64, but with a laterally extended movable member (plate) carrying a tip directed downwards, i.e. towards the base surface 22 of the body.

The invention claimed is:

1. Positioning apparatus comprising:
    a first surface;
    a tubular body having a longitudinal axis and a first end surface at a first end of the tubular body, the first end surface being arranged in contact with the first surface; and
    surface wave generation means arranged to generate a first travelling surface wave on the first end surface, the first travelling surface wave travelling along a first portion of the first end surface in a first direction around the first end surface, and, while the first travelling surface wave is travelling along the first portion of the first end surface, to generate a second travelling surface wave on the first end surface, the second travelling surface wave travelling along a second portion of the first end surface in a second direction around the first end surface, the second direction being opposite to the first direction,
    such that interaction between the first surface and the first and second travelling surface waves effects relative movement between the first surface and the tubular body.

2. Positioning apparatus in accordance with claim 1, wherein the tubular body is a hollow cylinder having a circular cross section.

3. Positioning apparatus in accordance with claim 1, wherein the tubular body comprises piezoelectric material, and the surface wave generation means comprises a plurality of electrodes and control means arranged to apply voltages to the electrodes in a predetermined manner, the electrodes being arranged with respect to the tubular body such that the applied voltages result in electric fields being applied to the piezoelectric material to effect dimensional changes and generate the first and second travelling surface waves.

4. Positioning apparatus in accordance with claim 3, wherein the piezoelectric material is poled radially with respect to the longitudinal axis.

5. Positioning apparatus in accordance with claim 3, wherein the surface wave generation means comprises a plurality of electrodes spaced apart around at least one of an outer surface and an inner surface of the tubular body.

6. Positioning apparatus in accordance with claim 5, wherein the surface wave generation means comprises control means arranged to apply voltages to the spaced-apart electrodes in a predetermined sequence so as to effect dimensional changes in the piezoelectric material and generate the first and second travelling surface waves.

7. Positioning apparatus in accordance with claim 5, wherein the spaced-apart electrodes include a first group of electrodes extending around a first section of the tubular body, the first portion of the first end surface being an end surface of the first section, and a second group of electrodes extending around a second section of the tubular body, the second portion of the first end surface being an end surface of the second section.

8. Positioning apparatus in accordance with claim 5, wherein the spaced-apart electrodes are arranged around a first longitudinal segment of the tubular body, the first longitudinal segment being proximate the first end.

9. Positioning apparatus in accordance with claim 8, further comprising an array of electrodes arranged around a second longitudinal segment of the tubular body, the second longitudinal segment being on the opposite side of the first longitudinal segment to the first end, and displacement control means arranged to apply voltages to the electrodes of the array so as to effect dimensional changes in the piezoelectric material which result in displacement of the first end surface in at least one direction perpendicular to the longitudinal axis.

10. Positioning apparatus in accordance with claim 9, wherein the array of electrodes comprises four electrodes spaced around the second longitudinal segment, the four electrodes comprising a first diametrically opposed pair and a second diametrically opposed pair, the displacement control means being arranged to apply voltages to the electrodes of the first pair to effect displacement of the first end surface in a first direction perpendicular to the longitudinal axis and to apply voltages to the electrodes of the second pair to effect displacement of the first end surface in a second direction perpendicular to the longitudinal axis.

11. Positioning apparatus in accordance with claim 1, wherein the first surface is flat and the first and second travelling waves interact with the first surface to effect relative movement comprising a relative translation between the tubular body and the first surface.

12. Positioning apparatus in accordance with claim 1, wherein the first surface is spherical or cylindrical and the first and second travelling waves interact with the first surface to effect relative movement comprising a relative rotation between the tubular body and the first surface about an axis perpendicular to the longitudinal axis.

13. Positioning apparatus in accordance with claim 1, wherein the first end surface is shaped so as to correspond to the shape of the portion of the first surface with which it is in contact.

14. Positioning apparatus in accordance with claim 1, further comprising biasing means arranged to urge the first end surface and the first surface together.

15. Positioning apparatus in accordance with claim 1, wherein at least one of the first surface and the first end surface comprises wear-resistant material.

16. Positioning apparatus in accordance with claim 1, wherein the first and second portions together comprise the entire first end surface.

17. Positioning apparatus in accordance with claim 1, wherein the first and second portions together comprise only a portion of the entire first end surface.

18. Positioning apparatus in accordance with claim 17, wherein the first and second portions are diametrically opposed to each other.

19. Positioning apparatus in accordance with claim 1, comprising a body supported by the tubular body and wherein the first surface is a surface of the supported body.

20. Positioning apparatus in accordance with claim 19, further comprising a base supporting the tubular body, the base providing a base surface, and the tubular body having a second end surface at a second end of the tubular body, the second end surface being arranged in contact with the base surface, wherein the surface wave generation means is further arranged to generate a third travelling surface wave on the second end surface, the third travelling surface wave travelling along a first portion of the second end surface in a first direction around the second end surface, and, while the third travelling surface wave is travelling along the first portion of the second end surface, to generate a fourth travelling surface wave on the second end surface, the fourth travelling surface wave travelling along a second portion of the second end surface in a second direction around the second end surface, such that the third and fourth travelling surface waves interact with the base surface to effect movement of the tubular body relative to the base.

21. Positioning apparatus in accordance with claim 20, wherein the tubular body is a tube of piezoelectric material and the surface wave generation means comprises a plurality of electrodes arranged around a third longitudinal segment of the tubular body, the third longitudinal segment being proximate the second end, and control means arranged to arranged to apply voltages to the third longitudinal segment electrodes in a predetermined sequence so as to effect dimensional changes in the piezoelectric material and generate the third and fourth travelling surface waves.

22. Positioning apparatus in accordance with claim 20, wherein the second end surface and the base surface are flat, and the movement effected between the tubular body and the base comprises translation of the tubular body over the base surface.

23. A method of effecting relative movement between a first surface and a tubular body, the tubular body having a longitudinal axis and an end surface at one end of the tubular body, the method comprising the steps of:
arranging the first end surface in contact with the first surface;
generating a first travelling surface wave on the end surface, the first travelling surface wave travelling along a first portion of the end surface in a first direction around the end surface; and,
while the first travelling surface wave is travelling along the first portion of the end surface, generating a second travelling surface wave on the end surface, the second travelling surface wave travelling along a second portion of the end surface in a second direction around the end surface, the second direction being opposite to the first direction.

24. A method in accordance with claim 23, wherein the first surface and the end surface are flat and the first and second travelling surface waves interact with the first surface to produce relative translation between the first surface and the end surface in a direction transverse to the longitudinal axis.

25. A method in accordance with claim 23, wherein the first surface is curved and the first and second travelling surface waves interact with the first surface to produce relative rotation between the first surface and the end surface about an axis other than the longitudinal axis.

* * * * *